(12) United States Patent
Satou et al.

(10) Patent No.: US 10,218,287 B2
(45) Date of Patent: Feb. 26, 2019

(54) POWER CONVERSION DEVICE

(71) Applicant: DAIKIN INDUSTRIES, LTD., Osaka-Shi, Osaka (JP)

(72) Inventors: Toshiaki Satou, Osaka (JP); Junya Mitsui, Osaka (JP)

(73) Assignee: DAIKIN INDUSTRIES, LTD., Osaka-Shi, Osaka (JP)

(*) Notice: Subject to any disclaimer, the term of this patent is extended or adjusted under 35 U.S.C. 154(b) by 0 days.

(21) Appl. No.: 15/781,277

(22) PCT Filed: Dec. 6, 2016

(86) PCT No.: PCT/JP2016/086258
§ 371 (c)(1),
(2) Date: Jun. 4, 2018

(87) PCT Pub. No.: WO2017/115621
PCT Pub. Date: Jul. 6, 2017

(65) Prior Publication Data
US 2018/0367058 A1 Dec. 20, 2018

(30) Foreign Application Priority Data

Dec. 28, 2015 (JP) ................................ 2015-256508
Jul. 28, 2016 (JP) ................................ 2016-148393

(51) Int. Cl.
*H02M 7/155* (2006.01)
*H02M 7/217* (2006.01)
*H02M 1/42* (2007.01)

(52) U.S. Cl.
CPC ......... *H02M 7/217* (2013.01); *H02M 1/4225* (2013.01)

(58) Field of Classification Search
CPC ..................................................... H02M 7/155
(Continued)

(56) References Cited

U.S. PATENT DOCUMENTS 6,134,126 A * 10/2000 Ikekame ................... H02J 3/01
307/105
6,137,700 A    10/2000 Iida et al.
(Continued)

FOREIGN PATENT DOCUMENTS

JP    2-84070 A    3/1990
JP    9-266674 A    10/1997
(Continued)

OTHER PUBLICATIONS

International Search Report, issued in PCT/JP2016/086258, PCT/ISA/210, dated Feb. 14, 2017.

*Primary Examiner* — Adolf Berhane
*Assistant Examiner* — Nusrat Quddus
(74) *Attorney, Agent, or Firm* — Birch, Stewart, Kolasch & Birch, LLP

(57) ABSTRACT

A power conversion device includes a single phase full-bridge rectification circuit, a reactor being connected to a power source in series between one of input terminals of the single phase full-bridge rectification circuit and the power source, capacitors being connected to each other in series via a connection point between output terminals of the single phase full-bridge rectification circuit, a first switch connected between the input terminal and the connection point, and a second switch connected between the input terminals.

32 Claims, 13 Drawing Sheets

(58) Field of Classification Search
USPC .................. 363/74, 77, 81, 84, 89, 125–127
See application file for complete search history.

(56) References Cited

U.S. PATENT DOCUMENTS

| | | | | |
|---|---|---|---|---|
| 6,151,228 | A * | 11/2000 | Miyazaki | H02J 3/01 363/37 |
| 6,459,597 | B1 * | 10/2002 | Igarashi | H02M 1/12 363/34 |
| 9,312,780 | B2 * | 4/2016 | Taguchi | H02M 7/48 |
| 2006/0049784 | A1 * | 3/2006 | Suzuki | B62D 5/046 318/400.3 |
| 2013/0155731 | A1 * | 6/2013 | Reichard | H02M 5/453 363/37 |
| 2015/0311816 | A1 | 10/2015 | Ohshita et al. | |

FOREIGN PATENT DOCUMENTS

| | | |
|---|---|---|
| JP | 10-174442 A | 6/1998 |
| JP | 11-164562 A | 6/1999 |
| JP | 2000-188867 A | 7/2000 |
| JP | 2001-95262 A | 4/2001 |
| JP | 2002-153068 A | 5/2002 |
| JP | 2003-153543 A | 5/2003 |
| JP | 2008-99512 A | 4/2008 |
| JP | 2014-113037 A | 6/2014 |
| JP | 2015-139301 A | 7/2015 |

* cited by examiner

F I G. 4
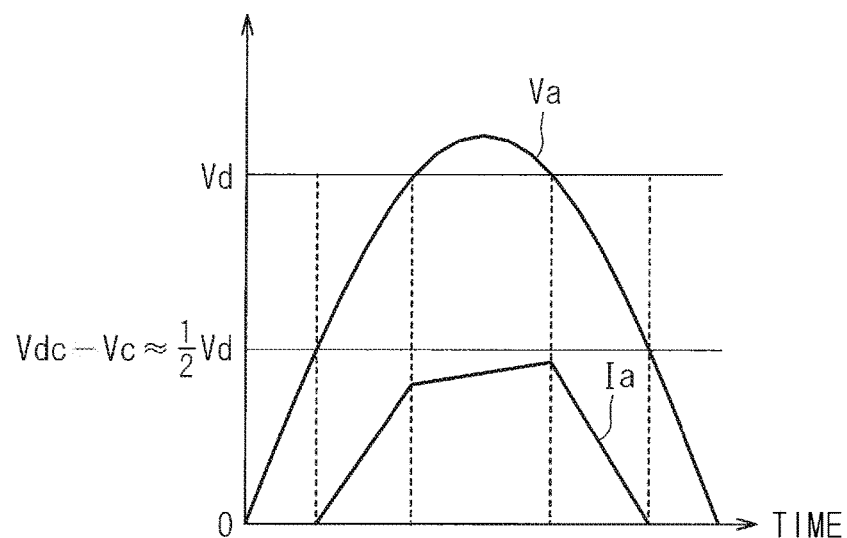
F I G. 5
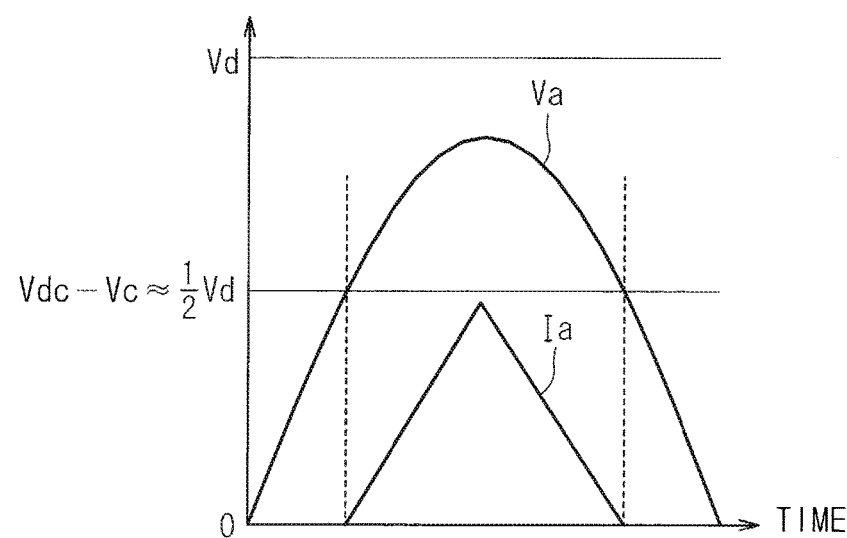

F I G. 6
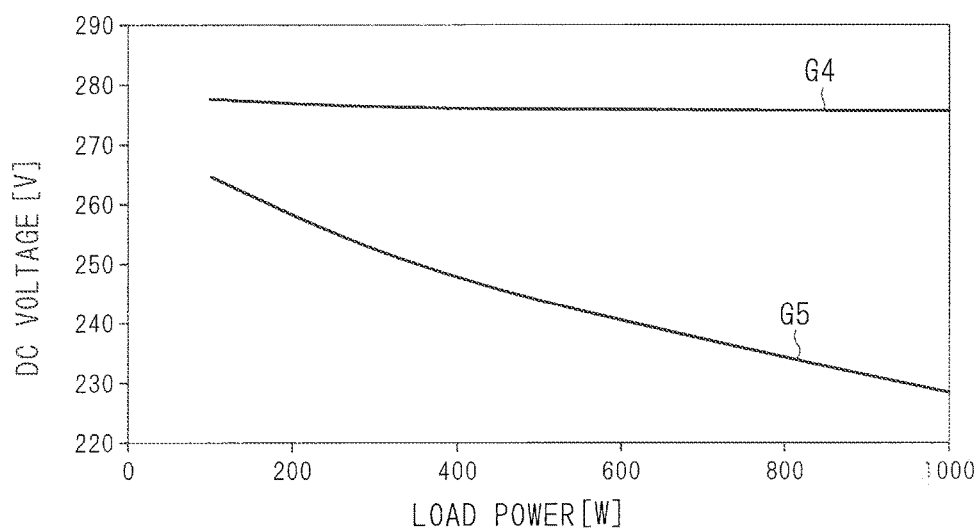

F I G. 7
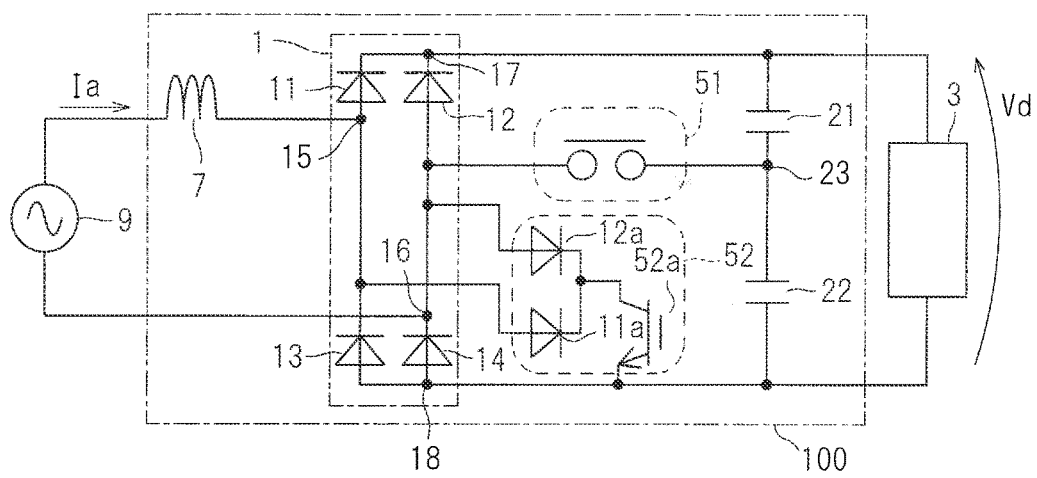
F I G. 8
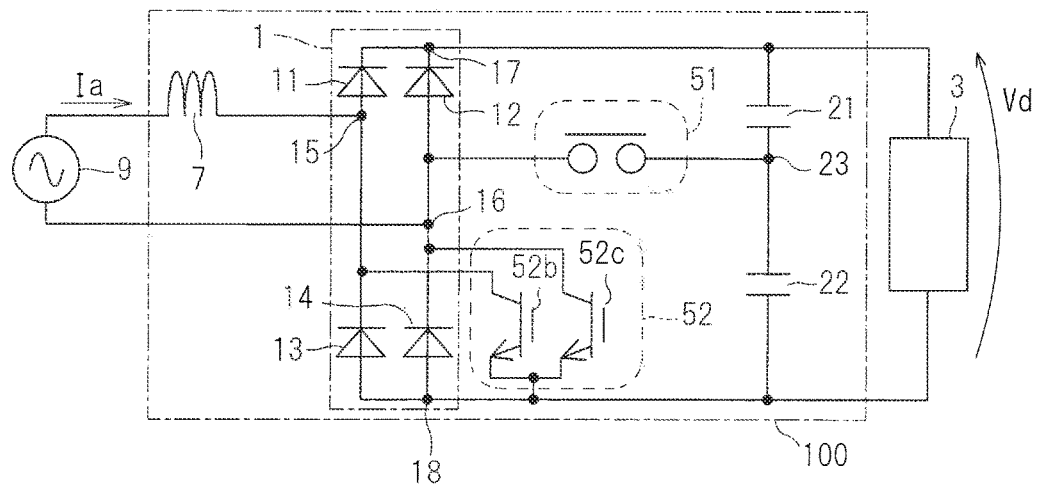

F I G. 9
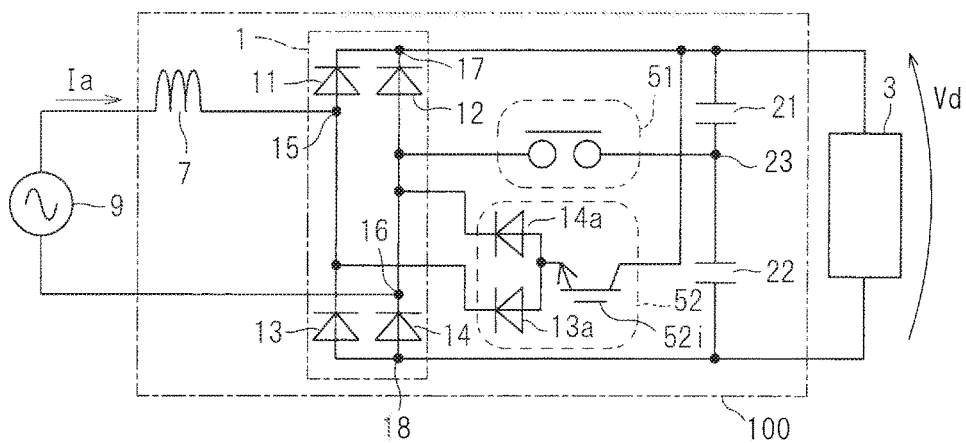
F I G. 1 0
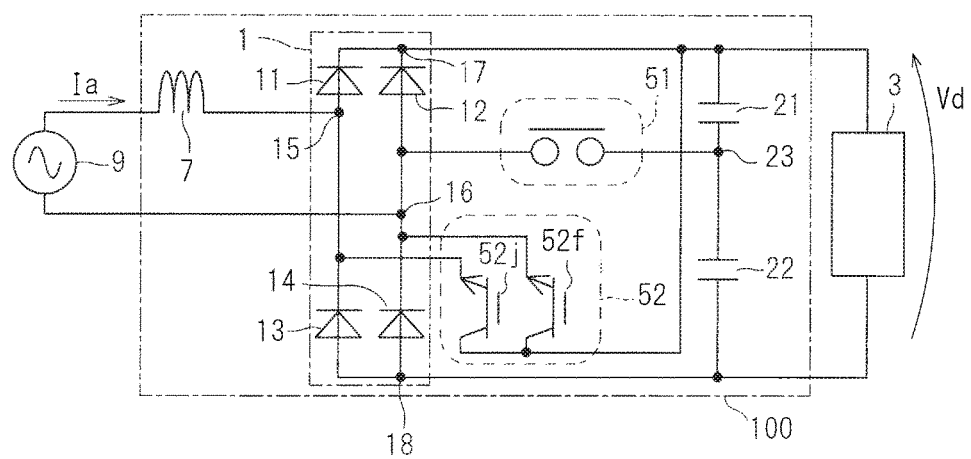

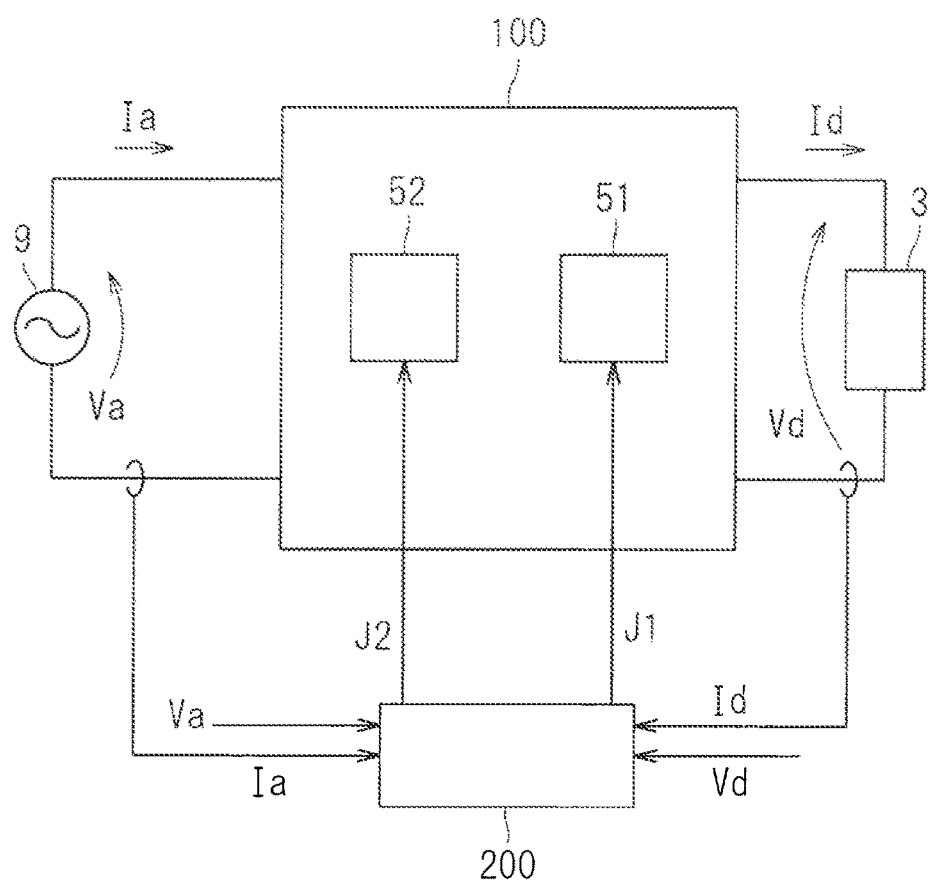
F I G . 2 4

POWER CONVERSION DEVICE

TECHNICAL FIELD

The present invention relates to a technique of converting AC voltage into DC voltage, and particularly relates to a technique of using a full-wave rectification and a voltage doubler rectification together.

BACKGROUND ART

Japanese Patent Application Laid-Open No. 10-174442 describes a converter which changes between a full-wave rectification circuit and a voltage doubler rectification circuit.

Japanese Patent Application Laid-Open No. 11-164562 describes a power conversion device which changes between a booster circuit and a voltage doubler rectification circuit.

Japanese Patent Application Laid-Open No. 2001-95262 describes a power conversion device which changes between a booster circuit, a voltage doubler rectification circuit, and a full-wave rectification circuit. The booster circuit can be used together with the voltage doubler rectification circuit, and can also be used together with the full-wave rectification circuit.

Japanese Patent Application Laid-Open No. 9-266674, Japanese Patent Application Laid-Open No. 2014-113037, and Japanese Patent Application Laid-Open No. 2000-188867 are associated with the present invention.

SUMMARY OF INVENTION

Problem to be Solved by the Invention

However, the technique described in Japanese Patent Application Laid-Open No. 2001-95262 defines operations of the booster circuit, the full-wave rectification circuit, and the voltage doubler rectification circuit with a focus on voltage of a smoothing capacitor, and does not have a perspective of improving a power factor. Accordingly, it does not also suggest an appropriate switching of the booster circuit and a changing between the full-wave rectification circuit and the voltage doubler rectification circuit to improve the power factor.

Based on this viewpoint, an object of the present application is to provide a technique of performing a switching of a booster circuit and a changing between a full-wave rectification circuit and a voltage doubler rectification circuit to improve a power factor.

Means to Solve the Problem

A power conversion device according to the present invention is a power conversion device (100) that converts a single phase AC voltage (Va) being output from a power source (9) into a DC voltage (Vd) and supplies the DC voltage to a load (3).

A first aspect of the present invention includes: a single phase full-bridge rectification circuit (1) which has a first input terminal (15) and a second input terminal (16) in a pair and a first output terminal (17; 18) and a second output terminal (18; 17) in a pair on an opposite side to the power source with respect to the first input terminal and the second input terminal, the first output terminal and the second output terminal being connected to the load; a first capacitor (21; 22) and a second capacitor (22; 21) which are connected to each other in series via a connection point (23) between the first output terminal and the second output terminal to support the DC voltage; a reactor (7; 7a, 7b) which is connected to the power source in series via the single phase full-bridge rectification circuit between both ends of a series connection of the first capacitor and the second capacitor; a first switch (51) which is connected between the second input terminal (16) and the connection point (23) and configured to make a transition from a conduction state to a non-conduction state once in a half cycle period, which indicates a period between a pair of adjacent points of time when the AC voltage takes a median value of the AC voltage, when a conversion power of the power conversion device or an input current (Ia) supplied from the power source is equal to or larger than a first threshold value (W1; W1u; W1d; I1u; I1d); and a second switch (52) that performs a changing from a first state to a second state at least once in the half cycle period when the conversion power or the input current is equal to or larger than the first threshold value, the first state indicating a state where a pathway of current flowing in the reactor does not include the first capacitor and the second capacitor and the second state indicating a state where the pathway includes at least one of the first capacitor and the second capacitor.

A second aspect of the power conversion device according to the present invention is the first aspect thereof in which the reactor (7) is connected between the power source (9) and at least one of the first input terminal (15) and the second input terminal (16), the second switch (52) is connected between the first input terminal and the second input terminal, the second switch makes a transition from a conduction state to a non-conduction state at least once in the half cycle period when the conversion power or the input current (Ia) is equal to or larger than the first threshold value (W1; W1u; W1d; I1u; I1d).

A third aspect of the power conversion device according to the present invention is the first aspect thereof in which the reactor (7) is connected between the power source (9) and at least one of the first input terminal (15) and the second input terminal (16), the second switch (52) is connected between the first input terminal and second input terminal and the first output terminal (17; 18), the second switch makes a transition from a conduction state to a non-conduction state at least once in the half cycle period when the conversion power or the input current (Ia) is equal to or larger than the first threshold value (W1; W1u; W1d; I1u; I1d).

A fourth aspect of the power conversion device according to the present invention is the first aspect thereof further including a diode (52d; 52e) which is connected to the first capacitor (21; 22) in series between the first output terminal (17; 18) and the connection point (23), a forward direction of the diode coinciding with a direction in which a current charging the first capacitor flows, and is sandwiched between the first output terminal and the first capacitor. The reactor (7) is connected between the power source (9) and at least one of the first input terminal (15) and the second input terminal (16). The second switch (52) is connected between the first output terminal (17; 18) and the second output terminal (18; 17). The second switch makes a transition from a conduction state to a non-conduction state at least once in the half cycle period.

A fifth aspect of the power conversion device according to the present invention is the first aspect thereof in which the reactors (7a, 7b) are provided in a pair, and a first one of the reactors (7a; 7b) and a second one of the reactors (7b; 7a) are connected to the first output terminal (17; 18) and the second output terminal (18; 17), respectively. The fifth aspect of the power conversion device further includes a diode (52*d*; 52*e*) which is sandwiched between the first capacitor (21; 22) and the first one of the reactors and connected to the first capacitor and the first one of the reactors in series between the first output terminal and the connection point (23), a forward direction of the diode coinciding with a direction in which a current charging the first capacitor flows. The first one of the reactors is sandwiched between the first output terminal and the diode. The second switch (52) is sandwiched between the first one of the reactors and the second one of the reactors and is connected to the first one of the reactors and the second one of the reactors in series between the first output terminal and the second output terminal. The second switch makes a transition from a conduction state to a non-conduction state at least once in the half cycle period.

A sixth aspect of the power conversion device according to the present invention is the third or fourth aspect thereof further including a diode (52*d*; 52*e*) which is connected to the second capacitor (22; 21) in series between the second output terminal (18; 17) and the connection point (23) and is sandwiched between the second output terminal and the second capacitor, a forward direction of the diode coinciding with a direction in which a current charging the second capacitor flows.

A seventh aspect of the power conversion device according to the present invention is the fifth aspect thereof further including a diode (52*e*; 52*d*) which is sandwiched between the second capacitor (22; 21) and the second one of the reactors (7*b*; 7*a*) and is connected to the second capacitor and the second one of the reactors in series between the second output terminal (18; 17) and the connection point (23), and sandwiches the second one of the reactors together with the second output terminal, a forward direction of the diode coinciding with a direction in which a current charging the second capacitor flows.

An eighth aspect of the power conversion device according to the present invention is the first aspect thereof in which a second switch (52) includes a first switch element (52*g*) which is connected between the first output terminal (17) and the first input terminal (15) and the second switch element (52*h*) which is connected between the second output terminal (18) and the first input terminal. When the conversion power or the input current (Ia) is equal to or larger than the first threshold value (W1; W1u; W1d; I1u; I1d), the first switch element makes a transition from a conduction state to a non-conduction state at least once in the half cycle period in which potential of the second input terminal (16) is higher than potential of the first input terminal, and is in a non-conduction state in the half cycle period in which potential of the second input terminal is lower than potential of the first input terminal. When the conversion power or the input current is equal to or larger than the first threshold value, the second switch element makes a transition from a conduction state to a non-conduction state at least once in the half cycle period in which potential of the second input terminal is lower than potential of the first input terminal, and is in a non-conduction state in the half cycle period in which potential of the second input terminal is higher than potential of the first input terminal.

A ninth aspect of the power conversion device according to the present invention is the eighth aspect thereof further including a first diode (52*d*; 52*e*) and a second diode (52*e*; 52*d*). The first diode is connected to the first capacitor (21; 22) in series between the first output terminal (17; 18) and the connection point (23), a forward direction of the first diode coincides with a direction in which a current charging the first capacitor flows, and is sandwiched between the first output terminal and the first capacitor. The second diode is connected to the second capacitor (22; 21) in series between the second output terminal (18; 17) and the connection point (23), a forward direction of the second diode coincides with a direction in which a current charging the second capacitor flows, and is sandwiched between the second output terminal and the second capacitor.

A tenth aspect of the power conversion device according to the present invention is any one of the first to ninth aspects thereof in which when the conversion power or the input current (Ia) is equal to or larger than a second threshold value (W2; W2u; W2d; I2u; I2d), which is smaller than the first threshold value (W1; W1u; W1d; I1u; I1d), and smaller than the first threshold value, the first switch (51) makes a transition from a conduction state to a non-conduction state once in the half cycle period, and the second state is achieved without the changing of the second switch (52).

An eleventh aspect of the power conversion device according to the present invention is the tenth aspect thereof in which when the conversion power or the input current (Ia) is smaller than the second threshold value (W2; W2u; W2d; I2u; I2d), the first switch (51) is in a non-conduction state, and the second state is achieved without the changing of the second switch (52).

A twelfth aspect of the power conversion device according to the present invention is any one of the first to ninth aspects thereof in which when the conversion power is smaller than the first threshold value, the first switch (51) is in a non-conduction state, and the second state is achieved without the changing of the second switch (52).

A thirteenth aspect of the power conversion device according to the present invention is any one of the second, sixth, seventh, and ninth aspects thereof in which when the conversion power or the input current (Ia) is equal to or larger than the first threshold value (W1; W1u; W1d; I1u; I1d), the changing of the second switch (52) is performed when the first switch (51) is in a conduction state.

A fourteenth aspect of the power conversion device according to the present invention is any one of the first to thirteenth aspects thereof in which a point of time when the second switch (52) performs the changing is between a point of time after an elapse of $\frac{1}{6}$ of the half cycle period from a starting point of the half cycle period and a point of time after an elapse of $\frac{5}{6}$ of the half cycle period from the starting point.

A fifteenth aspect of the power conversion device according to the present invention is any one of the second, sixth, seventh, and ninth aspects thereof in which when the conversion power or the input current (Ia) is equal to or larger than the first threshold value (W1; W1u; W1d; I1u; I1d), a transition of the first switch (51) from a non-conduction state to a conduction state is performed when the first state is achieved.

A sixteenth aspect of the power conversion device according to the present invention is any one of the third to fifth and eighth aspects thereof in which when the conversion power or the input current (Ia) is equal to or larger than the first threshold value (W1; W1u; W1d; I1u; I1d), the changing of the second switch (52) is performed when the first switch (51) is in a non-conduction state, and a transition of the first switch (51) from a non-conduction state to a conduction state is performed when the second state is achieved.

The conversion power may be a power supplied to the load (3) or a power being input to the power conversion device (100). Operations of the first switch (51) and the second switch (52) may be controlled on the basis of a magnitude of the current (Ia) being input to the power conversion device (100). For example, the first threshold value (I1u) when the input current increases is larger than the first threshold value (I1d) when the input current (Ia) decreases.

Effects of the Invention

According to the power conversion device according to the present invention, a conduction angle of the current flowing in the power source is increased by the second switch and the power factor is improved, and energy accumulated in the reactor is supplied by changing of the second switch, thereby increasing the voltage supplied to the series connection of the first capacitor and the second capacitor. Accordingly, even when the voltage supplied to the pair of output terminals of the single phase full-bridge rectification circuit is increased by the conduction of the first switch, the conduction angle of the current flowing in the single phase full-bridge rectification circuit is increased and the power factor is improved.

According to the sixth, seventh, and ninth aspects of the power conversion device according to the present invention, even when the first state is achieved and the first switch is conducted, the discharge of the first capacitor or the second capacitor is inhibited.

According to the tenth aspect of the power conversion device according to the present invention, the power factor may be low when the conversion power is low, however, the voltage which the pair of capacitors supply to the load needs to be increased, thus the loss is reduced by achieving the second state without the changing of the second switch.

According to the eleventh aspect of the power conversion device according to the present invention, the power factor may be low when the conversion power is further low, and the voltage which the pair of capacitors supply to the load does not need to be increased, thus the loss is reduced by making the first switch be in the non-conduction state, and achieving the second state without the changing of the second switch.

According to the twelfth aspect of the power conversion device according to the present invention, the power factor may be low when the conversion power is low, and the voltage which the pair of capacitors supply to the load does not need to be increased, thus the loss is reduced by making the first switch be in the non-conduction state, and achieving the second state without the changing of the second switch.

According to the thirteenth aspect of the power conversion device according to the present invention, the function as the voltage doubler circuit is effective at the point of time when the changing from the first state to the second state is performed by the second switch, and the current being input is hardly reduced.

According to the fourteenth aspect of the power conversion device according to the present invention, the reduction in the current being input is prevented.

According to the fifteenth aspect of the power conversion device according to the present invention, a reverse recovery phenomenon in the rectification element constituting the single phase full-bridge rectification circuit is prevented, and the reduction in the efficiency is thereby prevented.

According to the sixteenth aspect of the power conversion device according to the present invention, the discharge of the first capacitor or the second capacitor is inhibited.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a graph schematically illustrating the current behavior in the second operation;

FIG. 5 is a graph schematically illustrating the current behavior in the second operation;

FIG. 6 is a graph illustrating a comparison between a bridgeless power factor correction circuit and the power conversion device in FIG. 1;

FIG. 7 is a circuit diagram illustrating a configuration according to a first modification;

FIG. 8 is a circuit diagram illustrating a configuration according to a second modification;

FIG. 9 is a circuit diagram illustrating a configuration according to a third modification;

FIG. 10 is a circuit diagram illustrating a configuration according to a fourth modification;

FIG. 24 is a block diagram illustrating an example of a configuration of controlling operations of a first switch and a second switch.

DESCRIPTION OF EMBODIMENT(S)

Basic Configuration.

Figure 1:
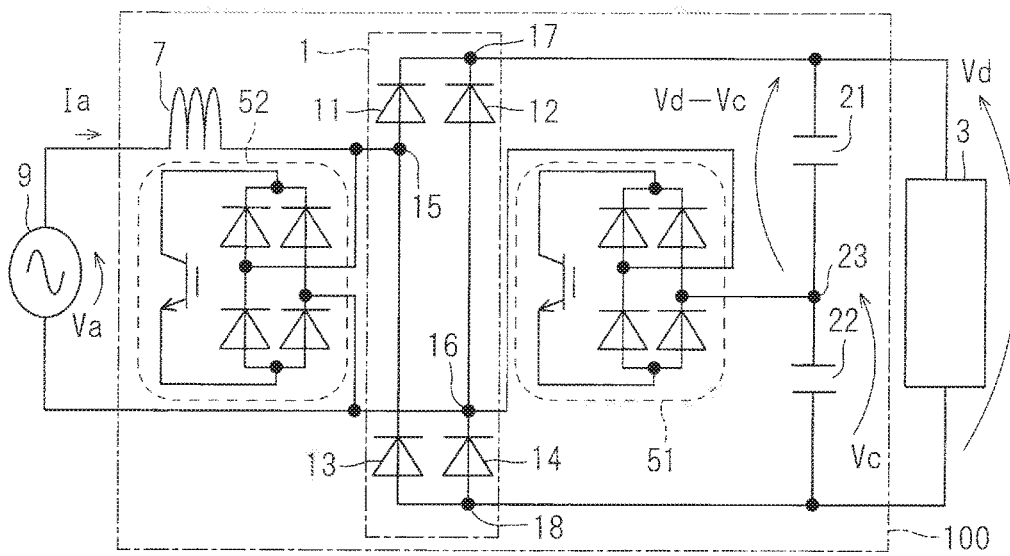
FIG. 1 is a circuit diagram illustrating an example of a configuration of a power conversion device adopted in all of embodiments.

FIG. 1 is a circuit diagram illustrating an example of a configuration of a power conversion device 100 adopted in all of embodiments described below. The power conversion device 100 converts a single phase AC voltage Va into a DC voltage Vd, and supplies the DC voltage Vd to a load 3. The AC voltage Va is output from a power source 9.

A conversion power in the power conversion device 100 can be understood as an input power determined by an input current Ia of an alternate current supplied from the power source 9 to the power conversion device 100, the AC voltage Va, and a power factor, or can also be understood as a load power supplied to the load 3 (which is determined by the DC voltage Vd and an impedance of the load 3 or by the DC voltage Vd and a current changing in accordance with a magnitude of the load). Needless to say, the input power and the load power are equal to each other when a power loss in the power conversion device 100 is ignored. Since the power loss in the power conversion device 100 generally takes a value of approximately several % of both the input power and the load power, it is reasonable that the power loss is ignored unless the circumstances are exceptional. The load power is described hereinafter as an example of the conversion power.

The power conversion device 100 includes a single phase full-bridge rectification circuit 1, a reactor 7, capacitors 21 and 22, a first switch 51, and a second switch 52.

The single phase full-bridge rectification circuit 1 has input terminals 15 and 16 in a pair and output terminals 17 and 18 connected to the load 3. The output terminals 17 and 18 are in a pair on an opposite side to the power source 9 with respect to the input terminals 15 and 16. Specifically, the single phase full-bridge rectification circuit 1 has diodes 11, 12, 13, and 14. An anode of the diode 11 is connected to the input terminal 15 together with a cathode of the diode 13, an anode of the diode 12 is connected to the input terminal 16 together with a cathode of the diode 14, a cathode of the diode 11 is connected to the output terminal 17 together with a cathode of the diode 12, and an anode of the diode 13 is connected to the output terminal 18 together with an anode of the diode 14.

The reactor 7 is connected between at least one of the input terminals 15 and 16 and the power source 9. In FIG. 1, the reactor 7 is disposed between the power source 9 and the input terminal 15, however, the reactor 7 may be disposed between the power source 9 and the input terminal 16. Alternatively, one reactor may be disposed between the power source 9 and the input terminal 15 and also between the power source 9 and the input terminal 16. The reason is that these one pair of reactors are electrically equivalent to the one reactor 7.

The one pair of capacitors 21 and 22 are connected to each other in series via a connection point 23 between the output terminals 17 and 18. The series connection of the capacitors 21 and 22 supports the DC voltage Vd.

The first switch 51 is connected between the input terminal 16 and the connection point 23. In the present embodiment, the second switch 52 is connected between the input terminals 15 and 16. Although a detailed description of a configuration of the first switch 51 and a configuration of the second switch 52 themselves is omitted by reason that those configurations are well-known techniques, each of the first switch 51 and the second switch 52 can be achieved by a dual-directional semiconductor switch in the present embodiment. For example, illustrated in FIG. 1 is an example of a case where each of the first switch 51 and the second switch 52 is constituted of a parallel connection of an IGBT (insulated gate bipolar transistor) and a diode bridge.

As is well-known from Japanese Patent Application Laid-Open No. 10-174442, Japanese Patent Application Laid-Open No. 11-164562, and Japanese Patent Application Laid-Open No. 2001-95262, when the first switch 51 is in a conduction state, the single phase full-bridge rectification circuit 1 and the capacitors 21 and 22 constitute a voltage doubler rectification circuit, and when the first switch 51 is in a non-conduction state, the single phase full-bridge rectification circuit 1 and the capacitors 21 and 22 constitute a full-wave rectification circuit.

A first state where a pathway of current flowing in the reactor 7 (the input current Ia in the present embodiment) does not include the capacitors 21 and 22 is achieved by the second switch 52 being in a conduction state. In the first state, energy caused by the current flowing via the second switch 52 is accumulated in the reactor 7. A second state where the pathway of the current flowing in the reactor 7 includes at least one of the capacitors 21 and 22 is achieved by the second switch 52 being in a non-conduction state. The energy accumulated in the first state is supplied to at least one of the capacitors 21 and 22 via the single phase full-bridge rectification circuit 1 in the second state achieved by a transition of the second switch 52 from the conduction state to the non-conduction state. Voltage between both ends of at least one of the capacitors 21 and 22 is thereby increased. As described above, the reactor 7 and the second switch 52 perform the boosting operation in accordance with the performance of the second switch 52 changing from the first state to the second state. That is to say, the second switch 52 can be deemed to constitute the booster circuit together with the reactor 7, the diodes 11 and 12, and the capacitors 21 and 22.

The load 3 is a combination of an inverter performing a DC/AC conversion and an AC motor to which the AC power is supplied from the inverter, for example.

First Embodiment

Figure 2:
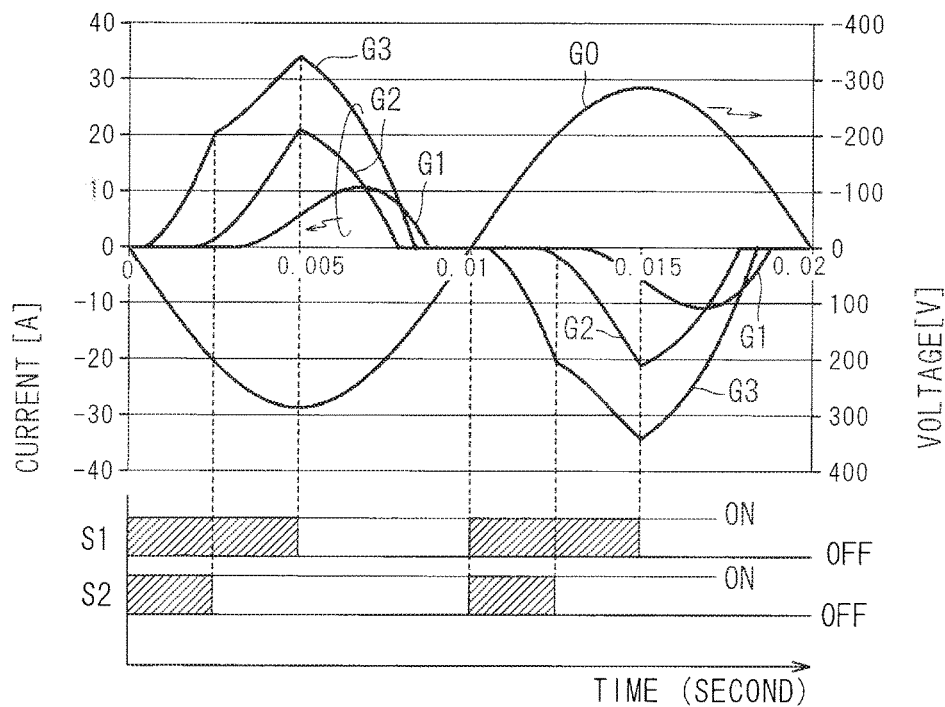
FIG. 2 is a graph illustrating an example of an operation of the power conversion device in the first embodiment.

FIG. 2 is a graph illustrating an example of an operation of the power conversion device 100 in the present embodiment. A waveform G0 is a waveform of the AC voltage Va, and is illustrated with a polarity of a vertical axis indicating a value of the waveform being opposite to a usual one. The waveform G0 is illustrated with its polarity being opposite to simply prevent the waveform G0 from crossing the other waveforms G1, G2, and G3 and thereby being hardly seen.

The waveform G1 is a waveform of the input current Ia (which is the current flowing in the reactor 7 herein) in a case where both the first switch 51 and the second switch 52 are in the non-conduction state. In the above case, the full-wave rectification is performed without the boosting operation by the second switch 52 and the reactor 7. The waveform G2 is a waveform of the input current Ia in a case where the first switch 51 enters the conduction state and the non-conduction state repeatedly and the second switch 52 is in the non-conduction state (the second operation). In the above case, the voltage doubler rectification and the full-wave rectification are performed alternately without the boosting operation by the second switch 52 and the reactor 7. In the first operation and the second operation, not the first state but the second state is achieved. The waveform G3 is a waveform of the input current Ia in a case where the first switch 51 enters the conduction state and the non-conduction state repeatedly and the second switch 52 enters the conduction state and the non-conduction state repeatedly (a third operation). In the above case, the voltage doubler rectification and the full-wave rectification are performed alternately with the boosting operation by the second switch 52 and the reactor 7.

In FIG. 2, symbols S1 and S2 indicate the conduction state/non-conduction state of the first switch 51 and the second switch 52 in the third operation by ON/OFF, respectively. In the third operation, the first switch 51 makes a transition from the conduction state to the non-conduction state once in a half cycle period of the AC voltage Va. Herein, the half cycle period indicates a period between a pair of adjacent points of time (times 0 and 0.01 (seconds) or times 0.01 and 0.02 (seconds) in FIG. 2) when the AC voltage Va takes its median value (a value 0 in FIG. 2). In the third operation, the second switch 52 makes a transition from the conduction state to the non-conduction state at least once in the half cycle period.

Needless to say, the first switch 51 makes the transition from the non-conduction state to the conduction state once in a period of half a length of a cycle of the AC voltage Va (this does not necessarily coincide with the half cycle period described above) to achieve the transition of the first switch 51 from the conduction state to the non-conduction state as described above. Here, the transition of the first switch 51 from the non-conduction state to the conduction state may be performed at a boundary of a pair of the adjacent half cycle periods defined above. FIG. 2 illustrates an example of such a transition from the non-conduction state to the conduction state.

Needless to say, in the similar manner, the second switch 52 makes the transition from the non-conduction state to the conduction state in a period of half the length of the cycle of the AC voltage Va as many times as the number of transitions from the conduction state to the non-conduction state in the half cycle period to achieve the transition of the second switch 52 from the conduction state to the non-conduction state. This transition may also be performed at the boundary of the pair of the adjacent half cycle periods.

In the third operation (the waveform G3) in FIG. 2, the first switch 51 makes the transition from the non-conduction state to the conduction state at the time 0, makes the transition from the conduction state to the non-conduction state at the time 0.005 (seconds), makes the transition from the non-conduction state to the conduction state at the time 0.01 (seconds), and makes the transition from the conduction state to the non-conduction state at the time 0.015 (seconds). The second switch 52 makes the transition from the non-conduction state to the conduction state at the time 0, makes the transition from the conduction state to the non-conduction state at the time 0.0025 (seconds), makes the transition from the non-conduction state to the conduction state at the time 0.01 (seconds), and makes the transition from the conduction state to the non-conduction state at the time 0.0125 (seconds).

In the second operation (the waveform G2), the first switch 51 makes the transition in the manner similar to the third operation, and the second switch 52 maintains the non-conduction state. In the first operation (the waveform G1), both the first switch 51 and the second switch 52 maintain the non-conduction state.

Figure 3:
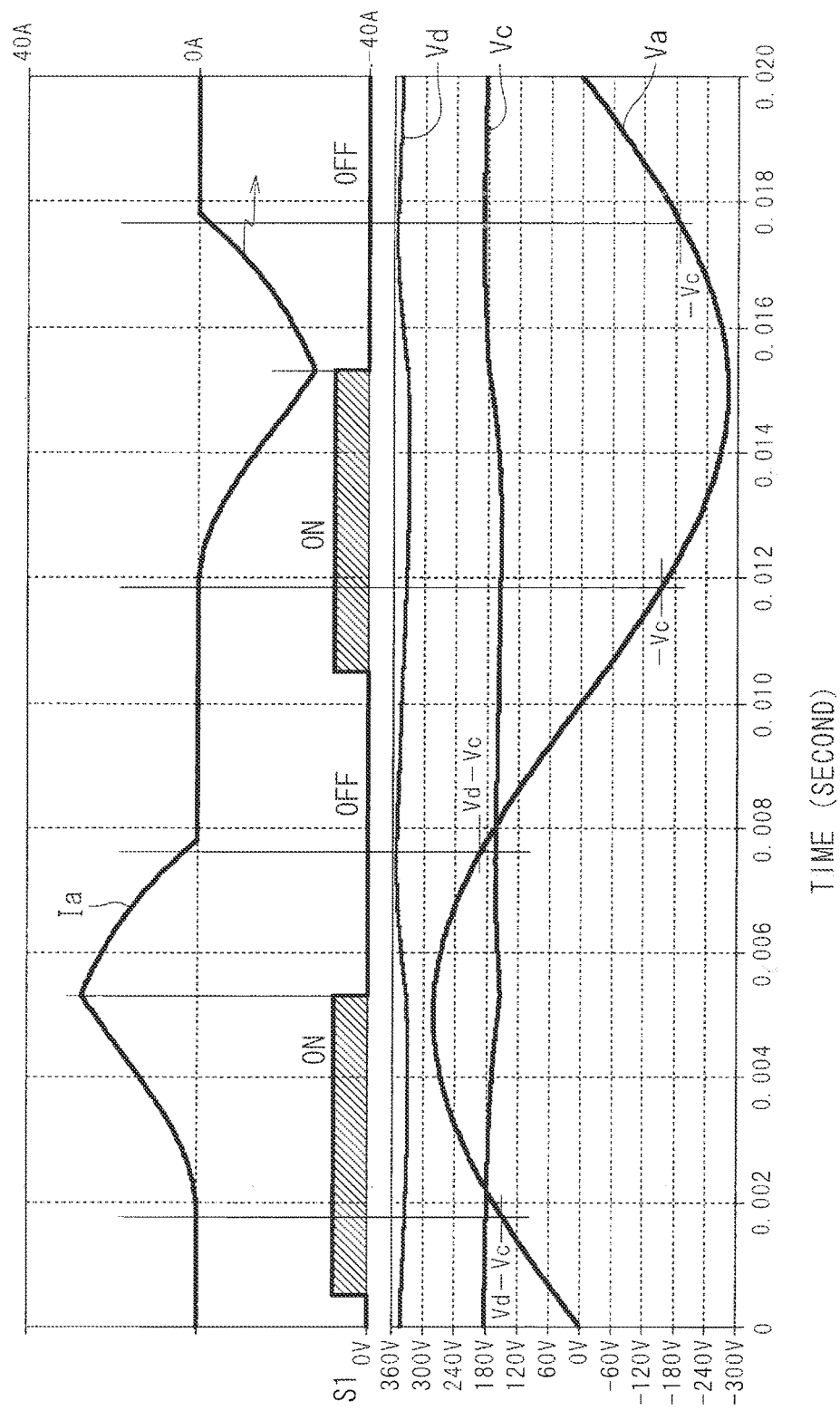
FIG. 3 is a graph illustrating a current behavior in a second operation.

FIG. 3 is a graph illustrating a behavior of the input current Ia in the second operation. Herein, illustrated herein is an example of a case where the first switch 51 makes the transition from the non-conduction state to the conduction state at other than the boundary of the pair of the adjacent half cycle periods. In FIG. 3, the symbol S1 indicates the conduction state/non-conduction state of the first switch 51 in the second operation by ON/OFF. In the second operation, the voltage doubler rectification and the full-wave rectification are performed alternately. Accordingly, the DC voltage Vd can be set higher than a crest value of the AC voltage Va even when the second state is maintained. Although it is well-known in Japanese Patent Application Laid-Open No. 9-266674 to forcibly flow the current in the reactor 7 in a predetermined phase section, the second operation also performs the full-wave rectification, thus is preferable from a viewpoint that a peak of the current can be suppressed. FIG. 3 also illustrates a voltage Vc at both ends of the capacitor 22.

The input current Ia does not basically flow when an absolute value of the crest value of the AC voltage Va is lower than the voltage Vc and the voltage (Vd−Vc). That is to say, in the second operation, a conduction angle of the current flowing in the single phase full-bridge rectification circuit 1 can hardly be increased with freedom, and the power factor is hardly improved.

Since almost a half value Vd/2 of the DC voltage Vd is applied to each of the capacitors 21 and 22 (not shown in the drawings), both the voltages Vc and (Vd−Vc) take a value of approximately the half value Vd/2. The capacitors 21 and 22 are not charged simultaneously, thus both the voltages Vc and (Vd−Vc) take a value slightly deviating from the half value Vd/2. A point of time when the input current Ia stops flowing also deviates from a point of time of Vc=|Va| or Vd−Vc=|Va|. Considered as one of the factors is an influence of the voltage supported by the reactor 7 and the diode in the single phase full-bridge rectification circuit 1.

FIG. 4 and FIG. 5 are graphs schematically illustrating a behavior of the input current Ia in the second operation. In a period of |Va|>Vc and |Va|>Vd−Vc (≈Vd/2), the current which charges the capacitor 21 or 22 in accordance with positive and negative of the power source voltage flows. Particularly, in a period of |Va|>Vd when the power source voltage is further high (large), the current which charges both the capacitors 21 and 22 flows.

As understood from the description using FIG. 3, a conduction angle of the input current Ia is increased as the DC voltage Vd decreases. Accordingly, when the waveform of the AC voltage Va is the same, the conduction angle is smaller in a case where the DC voltage Vd is high as illustrated in FIG. 5 than a case where the DC voltage Vd is low as illustrated in FIG. 4. That is to say, in the second operation, a magnitude (height) of the DC voltage Vd and the a height of the power factor have a trade-off relationship with each other.

However, in the third operation, as illustrated as the waveform G3 in FIG. 2, the input current Ia flows also when the second switch 52 is in the conduction state and the first state is achieved, and the conduction angle of the input current Ia is larger than that in the second operation. Accordingly, the power factor is high in the third operation compared to the second operation. Furthermore, not only the voltage doubler rectification but also the boosting operation by the second switch 52 and the reactor 7 is performed, thus the DC voltage Vd which is obtained can be further increased. That is to say, the third operation increases the DC voltage Vd compared to the second operation.

FIG. 2 illustrates an example of a case where the second switch 52 makes the transition from the conduction state to the non-conduction state only once in the half cycle period. However, the similar effect is obtained even when such a transition is performed multiple times in the half cycle period. In the above case, the number of switchings increases and a loss increases, however, controllability of the power factor is enhanced.

The number of switchings in the power conversion device 100 as a whole increases in the second operation compared to the first operation and in the third operation compared to the second operation. The increase in the number of switchings increases a switching loss and a conduction loss of the first switch 51 and the second switch 52, increasing the loss in the power conversion device 100.

For example, in a power factor correction circuit performing a switching operation over an entire power source cycle (tentatively referred to as "a full-switching power factor correction circuit" hereinafter) such as an interleaved power factor correction circuit and a bridgeless power factor correction circuit, the number of switchings increases even for a load of which a high power factor is not required, so that such the full-switching power factor correction circuit is disadvantageous from a viewpoint of efficiency. That is to say, it is preferable to decrease the number of switching for the load of which the high power factor is not required so that the efficiency is increased.

It is true that Japanese Patent Application Laid-Open No. 2014-113037 also proposes an operation which does not perform the switching in the interleaved power factor correction circuit (refer to "the non-conduction mode" described in Japanese Patent Application Laid-Open No. 2014-113037), however, DC voltage which occurs increases, and a switching loss in an inverter which is subsequently disposed in the full-switching power factor correction circuit is increased. From a viewpoint of reducing the switching loss of the inverter, it is preferable to reduce the DC voltage in a state where a switch in a part having a boosting function does not perform the switching.

FIG. 6 is a graph illustrating a comparison between a bridgeless power factor correction circuit and the power conversion device 100 in FIG. 1. FIG. 6 herein illustrates a case where the parts having the boosting function in those circuit and device do not perform the switching operation. A waveform G4 indicates a relationship between the load power and the DC voltage (denoted as "DC VOLTAGE" in FIG. 6) in the bridgeless power factor correction circuit, and a waveform G5 indicates the relationship in the power conversion device 100. In this manner, the DC voltage occurring in the power conversion device 100 decreases with the increase in load (with the increase in load power), and in contrast, in the bridgeless power factor correction circuit, there is the small reduction in the DC voltage even when the load power is increased, and the DC voltage higher than the DC voltage occurring in the power conversion device 100 occurs. The DC voltage similar to the DC voltage in the bridgeless power factor correction circuit occurs in the interleaved power factor correction circuit.

The reason is that the full-switching power factor correction circuit generally has a high switching frequency, and the current is thus smoothed even when inductance of the reactor is small, thus the reactor having the small inductance is adopted. For example, the inductance is selected to be approximately several hundreds μH. Accordingly, a voltage drop caused by the flow of the current into the reactor is small, and as a result, the DC voltage is kept high. When the inductance is further small, there is a possibility, in the case where the switching operation is not performed, that the power factor is reduced, a peak of AC current increases, and a loss increases. In contrast, in the power conversion device 100 performing the second operation, the inductance of the reactor is selected to be large (for example, several mH), thus the voltage drop in the reactor increases and the DC voltage decreases, and the switching loss of the inverter is thus reduced.

From the above, the switching by the first switch 51 and the changing by the second switch 52 are preferably selected in accordance with the magnitude of the load 3 (that is to say, the load power: the magnitude of the conversion power of the power conversion device 100). As described above, the operation of the power conversion device 100 is classified into the three operations of the first operation, the second operation, and the third operation. The first operation, the second operation, and the third operation are preferably adopted in a light load, a middle load, and a heavy load, respectively, for the following reason. Specifically, it is preferable to adopt, in the power conversion device 100, the third operation when the load power is equal to or larger than a first threshold value, the second operation when the load power is equal to or larger than a second threshold value, which is smaller than the first threshold value, and smaller than the first threshold value, and the first operation when the load power is smaller than the second threshold value.

In the case of the light load, that is to say, when the load power is smaller than the second threshold value, the efficiency is considered to be important, and the high power factor is not required. Thus, the number of switchings is preferably small to reduce the loss. Even when the load 3 is a motor driven by the inverter, a required motor applied voltage is small in the light load, thus there is no need to increase the DC voltage Vd. Accordingly, it is preferable to adopt the first operation in which both the first switch 51 and the second switch 52 are in the non-conduction state. This is particularly important in an application to use in which a ratio of a light load operation to a whole operation time is large such as an inverter air conditioner. That is to say, an electricity cost in a whole operation decreases as the efficiency in the light load increases, and a value of APF (annual performance factor) which is a barometer of performance also increases.

In the case of the heavy load, that is to say, when the load power is equal to or larger than the first threshold value, the high DC voltage Vd and the high power factor are considered to be more important than the high efficiency. These are particularly required when the power source 9 is a commercial power source. The reason is that a maximum rating of the current is defined in the commercial power source, and even when an effective value of the flowing AC current is the same, it is required to increase an effective power which can be input to the load 3. Thus, it is preferable to increase an input power factor by increasing the conduction angle of the input current Ia to obtain the larger load power. Particularly, when the load 3 is the motor driven by the inverter, for example, the voltage applied to the motor needs to be further increased to drive the motor at high rotation speed and high torque. It is preferable to perform the third operation of increasing the DC voltage Vd from the needs.

In contrast, the case of the middle load, that is to say, when the load power is equal to or larger than the second threshold value and smaller than the first threshold value, the high power factor are considered to be more important than the high efficiency. In the manner similar to the above description, when the load 3 is the motor driven by the inverter, for example, it is preferable to increase the DC voltage Vd to the extent that a so-called field-weakening (flux-weakening) operation is not necessary so that the motor is driven at high rotation speed and high torque. Accordingly, it is preferable to perform the second operation to increase the DC voltage Vd while making the second switch 52 be in the non-conduction state to achieve the second state.

In the second operation, the period in which the first switch 51 is in the conduction state can be lengthened to increase the DC voltage Vd. In the third operation, the period in which the first switch 51 is in the conduction state can be set to be quarter of the power source cycle, for example, and the period in which the second switch 52 is in the conduction state to achieve the first state can be lengthened to increase the DC voltage Vd.

When the load 3 is classified into the heavy load or the light load without assuming the case of the middle load, the first operation may be adopted without setting the second threshold value in the case where the input power to the load 3 is smaller than the first threshold value.

Second Embodiment

The present embodiment describes a preferable aspect of the third operation. In the third operation of the present embodiment, in the half cycle period, the transition of the second switch 52 from the conduction state to the non-conduction state (the changing from the first state to the second state) is performed when the first switch 51 is in the conduction state.

According to such an operation, the single phase full-bridge rectification circuit 1 and the capacitors 21 and 22 already function as the voltage doubler rectification circuit at the time of the transition of the second switch 52 from the conduction state to the non-conduction state. Thus, even when the second switch 52 makes the transition from the conduction state to the non-conduction state, the input current Ia hardly decreases, and the current waveform closer to a sine wave and having the high power factor can be obtained.

It is preferable for the following reason that the point of time when the second switch 52 makes the transition from the conduction state to the non-conduction state comes after an elapse of ⅙ of the half cycle period from a starting point of the half cycle period and before an elapse of ⅚ of the half cycle period so that the reduction in the input current Ia is prevented.

The capacitors 21 and 22 functioning as a part of the voltage doubler rectification circuit are charged with approximately the half value Vd/2 of the DC voltage Vd. Accordingly, |Va|>Vd/2 needs to be satisfied to flow the input current Ia from the power source 9 to the capacitors 21 and 22 in the state where the second switch 52 is in the non-conduction state. The power source 9 outputs the AC voltage Va having such a value when the phase of the AC voltage Va falls within 30 to 150 degrees on a basis of the point of time when the AC voltage Va takes its median value (∵ sin(π/6)=sin(5π/6)=½). Accordingly, when the point of time when the second switch 52 makes the transition from the conduction state to the non-conduction state is selected as described above, the current flows from the single phase full-bridge rectification circuit 1 into at least one of the capacitors 21 and 22 immediately after the transition, thus the reduction in the input current Ia is prevented.

The power factor is most appropriate when the input current Ia has a sine wave form having the same phase as the AC voltage Va. Accordingly, it is preferable that there is a great need to increase the input current Ia in the transition of the second switch 52 from the conduction state to the non-conduction state when the phase of the AC voltage Va to which the basis described above is adopted is smaller than 90 degrees (until the AC voltage Va reaches its peak).

Needless to say, it is also applicable that the point of time when the second switch 52 makes the transition from the conduction state to the non-conduction state comes after the elapse of ⅙ of the half cycle period from the starting point of the half cycle period and before the elapse of ⅚ of the half cycle period and the first switch 51 is in the non-conduction state at the point of time.

Third Embodiment

The present embodiment describes a preferable aspect of the third operation. When the second switch 52 is in the non-conduction state and the second state is achieved, the pair of input terminals 15 and 16 are not short-circuited, and the power source 9 and the reactor 7 are connected in series therebetween.

When the input current Ia flows in the diode 11, the capacitors 21 and 22, and the diode 14 in the above state, the pathway of the input current Ia is changed from the capacitor 22 and the diode 14 to the first switch 51 at the time of the transition of the first switch 51 from the non-conduction state to the conduction state. A reverse recovery phenomenon thus occurs in the diode 14.

Alternatively, when the input current Ia flows in the diode 12, the capacitors 21 and 22, and the diode 13, the pathway of the input current Ia is changed from the capacitor 21 and the diode 12 to the first switch 51 at the time of the transition of the first switch 51 from the non-conduction state to the conduction state. A reverse recovery phenomenon thus occurs in the diode 12. Such a reverse recovery phenomenon in the diode is not preferable by reason that the diode causes a recovery loss and the efficiency is reduced.

Accordingly, in the third operation of the present embodiment, in the half cycle period, the transition of the first switch 51 from the non-conduction state to the conduction state is performed when the second switch 52 is in the conduction state and the first state is achieved.

When the second switch 52 is in the conduction state, the pair of input terminals 15 and 16 are short-circuited, thus the state of the first switch 51, that is the conduction state or the non-conduction state, does not have an influence on any of the input current Ia and the voltage of the capacitors 21 and 22. The reason is that the input current Ia flows in the second switch 52 having the impedance lower than a configuration of the single phase full-bridge rectification circuit 1 and the capacitors 21 and 22, and the first state is thus achieved, and the single phase full-bridge rectification circuit 1 does not serve as a discharge pathway of the capacitors 21 and 22.

Accordingly, the transition of the first switch 51 from the non-conduction state to the conduction state may be performed long before the point of time when the second switch 52 makes the transition from the conduction state to the non-conduction state. For example, the first switch 51 and the second switch 52 may simultaneously make the transition from the non-conduction state to the conduction state.

Modification of Circuit Configuration.

An example of the modification of the second switch 52 is illustrated hereinafter. The first switch 51 is illustrated as a simple switch, whose configuration is simplified.

In contrast to the configuration illustrated in FIG. 1, each of FIG. 7 to FIG. 10 illustrates a configuration, as a circuit diagram, of connecting the second switch 52 between the pair of input terminals 15 and 16 and one of the output terminals 17 and 18 (the output terminal 18 in FIG. 7 and FIG. 8 and the output terminal 17 in FIG. 9 and FIG. 10). The second switch 52 has a configuration not of a dual-directional switch but of a switch capable of flowing the current in one direction by conduction of the switch.

In the configuration in FIG. 7 (the first modification), the second switch 52 includes an IGBT 52a and diodes 11a and 12a. An anode of the diode 11a is connected to the input terminal 15, and an anode of the diode 12a is connected to the input terminal 16. A cathode of the diode 11a, a cathode of the diode 12a, and a collector of the IGBT 52a are connected in common, and an emitter of the IGBT 52a is connected to the output terminal 18. That is to say, in the first modification, the second switch 52 has the configuration of the switch capable of flowing the current from any of the input terminals 15 and 16 to the output terminal 18 by the conduction of the second switch 52.

In the configuration in FIG. 8 (the second modification), the second switch 52 includes IGBTs 52b and 52c. A collector of the IGBT 52b is connected to the input terminal 15, and a collector of the IGBT 52c is connected to the input terminal 16. An emitter of the IGBT 52b, an emitter of the IGBT 52c, and the output terminal 18 are connected in common. That is to say, also in the second modification, the second switch 52 has the configuration of the switch capable of flowing the current from any of the input terminals 15 and 16 to the output terminal 18 by the conduction of the second switch 52.

In the configuration in FIG. 9 (the third modification), the second switch 52 includes an IGBT 52i and diodes 13a and 14a. A cathode of the diode 13a is connected to the input terminal 15, and a cathode of the diode 14a is connected to the input terminal 16. An anode of the diode 13a, an anode of the diode 14a, and an emitter of the IGBT 52i are connected in common, and a collector of the IGBT 52i is connected to the output terminal 17. That is to say, in the third modification, the second switch 52 has the configuration of the switch capable of flowing the current from the output terminal 17 to any of the input terminals 15 and 16 by the conduction of the second switch 52.

In the configuration in FIG. 10 (the fourth modification), the second switch 52 includes IGBTs 52j and 52f. An emitter of the IGBT 52j is connected to the input terminal 15, and an emitter of the IGBT 52f is connected to the input terminal 16. A collector of the IGBT 52j, a collector of the IGBT 52f, and the output terminal 17 are connected in common. That is to say, also in the fourth modification, the second switch 52 has the configuration of the switch capable of flowing the current from the output terminal 17 to any of the input terminals 15 and 16 by the conduction of the second switch 52.

In the first modification and the third modification, a total number of elements constituting the second switch 52 seems to be the same, and their operations are equivalent to each other. However, as an actual application, a case of applying the first modification is general for the following reason. That is to say, in the first modification, the emitter of the IGBT 52a is connected to a side of negative potential of the DC voltage Vd, thus reference potential of a drive signal and drive power source of the IGBT 52a takes the side of the negative potential of the DC voltage Vd, and the IGBT 52a can be operated at the same reference potential as that of a control circuit (not shown) generating the drive signal. In contrast, in the third modification, reference potential of a drive signal and drive power source of the IGBT 52i cannot be the same as the reference potential of the control circuit (the side of the negative potential of the DC voltage Vd), so that a separated IGBT drive power source having another potential and level-shift circuit for the drive signal are needed. Thus, it is preferable to apply the first modification compared to the third modification from a viewpoint of preventing a complication and increase in cost of the circuit.

This viewpoint is also applied to the second modification and the fourth modification. Particularly, in the fourth modification, the emitters of the IGBT 52j and the IGBT 52f are not commonly used, so that the two IGBT drive power sources and the two level-shift circuits of the drive signal are needed to correspond to each IGBT. Thus, the difference between the second modification and the fourth modification in the viewpoint described above is more distinct than that between the first modification and the third modification in the viewpoint. Accordingly, the case of applying the second modification is more common than the case of applying the fourth modification.

Figure 11:
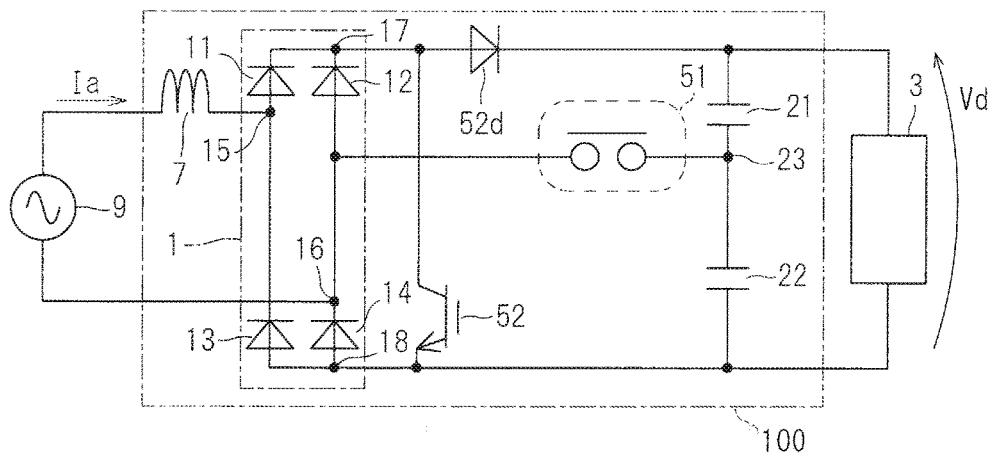
FIG. 11 is a circuit diagram illustrating a configuration according to a fifth modification.
Figure 12:
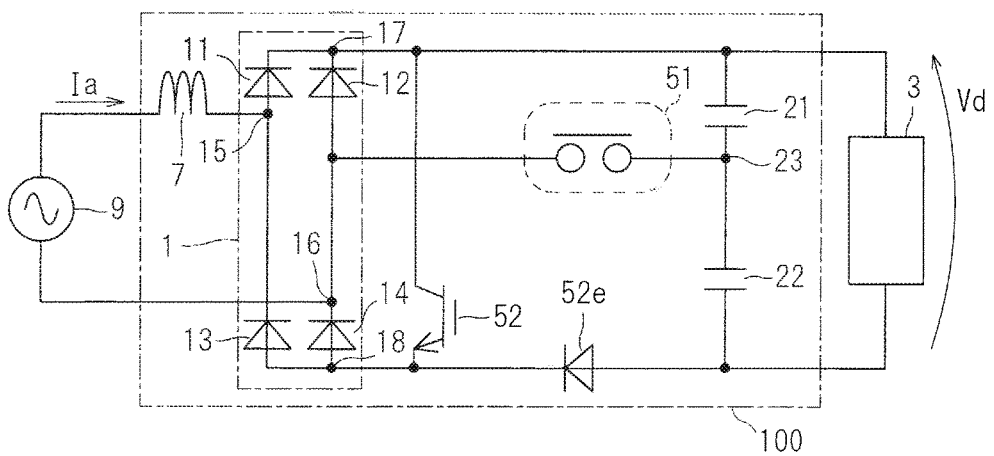
FIG. 12 is a circuit diagram illustrating a configuration according to a sixth modification.

Both in FIG. 11 and FIG. 12, the second switch 52 is provided between the output terminals 17 and 18, in contrast to the configuration illustrated in FIG. 1, and the conduction of the second switch 52 enables the current to flow from the output terminal 17 to the output terminal 18. Specifically, the second switch 52 is constituted of an IGBT having a collector connected to the output terminal 17 and an emitter connected to the output terminal 18.

Furthermore, in the configuration of FIG. 11 (a fifth modification), a diode 52d is connected to the capacitor 21 in series between the output terminal 17 and the connection point 23. A forward direction of the diode 52d coincides with a direction in which the current charging the capacitor 21 flows, that is to say, a direction from the output terminal 17 toward the capacitor 21. The diode 52d is sandwiched between the output terminal 17 and the capacitor 21. Specifically, an anode of the diode 52d is connected to the output terminal 17, and a cathode of the diode 52d is connected to the connection point 23 via the capacitor 21.

In the configuration of FIG. 12 (a sixth modification), a diode 52e is connected to the capacitor 22 in series between the output terminal 18 and the connection point 23. A forward direction of the diode 52e coincides with a direction in which the current charging the capacitor 22 flows, that is to say, a direction from the capacitor 22 toward the output terminal 18. The diode 52e is sandwiched between the output terminal 18 and the capacitor 22. Specifically, a cathode of the diode 52e is connected to the output terminal 18, and an anode of the diode 52e is connected to the connection point 23 via the capacitor 22.

In the first to sixth modifications, the second switch 52 is operated in the manner similar to the second switch 52 of the first embodiment, and the third operation can be achieved. That is to say, the changing of the second switch 52 makes the transition between the first state and the second state.

However, a state where both the first switch 51 and the second switch 52 are in the conduction state in the first to sixth embodiments, that is to say, the state where the first switch 51 is conducted in the first state should be avoided. The reason is that in such a state, the first switch 51 and the second switch 52 constitute a discharge pathway of at least one of the capacitors 21 and 22. Specifically, the discharge pathway of the capacitor 22 is formed in the configuration illustrated in FIG. 7, FIG. 8, and FIG. 11 (the first modification, the second modification, and the fifth modification), and the discharge pathway of the capacitor 21 is formed in the configuration illustrated in FIG. 9, FIG. 10, and FIG. 12 (the third modification, the fourth modification, and the sixth modification).

Thus, in the cases of the first to sixth modifications, the changing from the first state to the second state, that is the transition of the second switch 52 from the conduction state to the non-conduction state herein, needs to be performed when the first switch 51 is in the non-conductive state. Accordingly, the third operation in the second embodiment, in which the transition of the second switch 52 from the conduction state to the non-conduction state is performed when the first switch 51 is in the conduction state, cannot be achieved. Thus, in the first to sixth modifications, the input current Ia decreases and the power factor decreases compared to the second embodiment.

Furthermore, the diode 52d is included in the discharge pathway of the capacitor 21 in the fifth modification (FIG. 11), and the diode 52e is included in the discharge pathway of the capacitor 22 in the sixth modification (FIG. 12). Thus, the loss increases due to the conduction loss of the diode even in the case where the full-wave rectification or the voltage doubler rectification is performed.

In the first to sixth modifications, the transition of the first switch 51 from the non-conduction state to the conduction state needs to be performed when the second state is achieved, that is, when the second switch 52 is in the non-conduction state herein. Accordingly, the third operation in the third embodiment, in which the transition of the first switch 51 from the non-conduction state to the conduction state is performed when the second switch 52 is in the conduction state, cannot be achieved. Thus, these modifications cause the reverse recovery phenomenon of the diode, and are not preferable from the viewpoint of reducing the efficiency compared to the third embodiment.

Figure 13:
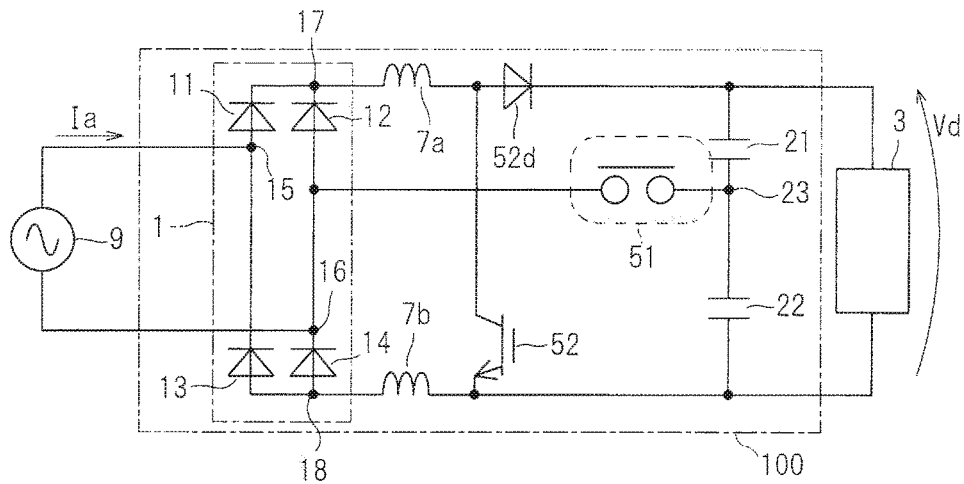
FIG. 13 is a circuit diagram illustrating a configuration according to a seventh modification.
Figure 14:
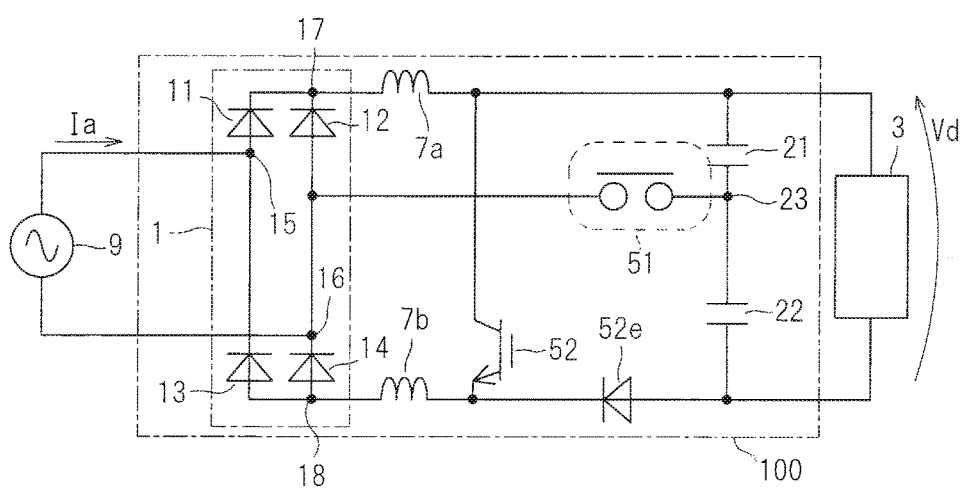
FIG. 14 is a circuit diagram illustrating a configuration according to an eighth modification.

FIG. 13 and FIG. 14 are circuit diagrams illustrating a configuration according to seventh modification and eighth modification, respectively. The seventh and eighth modifications illustrate an example of a configuration of dividing the reactor 7 according to the fifth modification (FIG. 11) and the sixth modification (FIG. 12) and placing the reactor 7 on a side nearer the capacitors 21 and 22 in relation to the single phase full-bridge rectification circuit 1. Specifically, a pair of reactors 7a and 7b are provided instead of the reactor 7. The reactor 7a is connected to the output terminal 17, and the reactor 7b is connected to the output terminal 18.

In the seventh modification (FIG. 13), the diode 52d is sandwiched between the capacitor 21 and the reactor 7a and connected to the capacitor 21 and the reactor 7a in series between the output terminal 17 and the connection point 23. A forward direction of the diode 52d coincides with a direction in which the current charging the capacitor 21 flows. The reactor 7a is sandwiched between the output terminal 17 and the diode 52d. Specifically, the anode of the diode 52d is connected to the output terminal 17 via the reactor 7a, and the cathode of the diode 52d is connected to the connection point 23 via the capacitor 21.

In the eighth modification (FIG. 14), the diode 52e is sandwiched between the capacitor 22 and the reactor 7b and connected to the capacitor 22 and the reactor 7b in series between the output terminal 18 and the connection point 23. A forward direction of the diode 52e coincides with a direction in which the current charging the capacitor 22 flows. The reactor 7b is sandwiched between the output terminal 18 and the diode 52e. Specifically, the cathode of the diode 52e is connected to the output terminal 18 via the reactor 7b, and the anode of the diode 52e is connected to the connection point 23 via the capacitor 22.

The pair of reactors 7a and 7b have a point in common with the reactor 7 illustrated in FIG. 1 and FIG. 7 to FIG. 12, the point is that the pair of reactors 7a and 7b are connected to the power source 9 in series via the single phase full-bridge rectification circuit 1 between both ends of the series connection of the capacitors 21 and 22. The second switch 52 is sandwiched between the reactors 7a and 7b and connected to the reactors 7a and 7b in series between the output terminals 17 and 18 in both the seventh modification (FIG. 13) and the eighth modification (FIG. 14).

In the above configuration, the reactors 7a and 7b function in the manner similar to the reactor 7 illustrated in FIG. 9. The second switch 52 can be deemed to constitute a booster circuit together with the reactors 7a and 7b, the diode 52d (or the diode 52e), and the capacitors 21 and 22.

Furthermore, in the configuration described in the seventh modification (FIG. 13), the reactor 7a reduces the discharge current of the capacitor 22 even when both the first switch 51 and the second switch 52 are in the conduction state. In the similar manner, in the configuration described in the eighth modification (FIG. 14), the reactor 7b reduces the discharge current of the capacitor 21 even when both the first switch 51 and the second switch 52 are in the conduction state.

However, it is preferable to avoid the state where both the first switch 51 and the second switch 52 are in the conduction state in order to inhibit the discharge current of the capacitor 22 in the configuration described in the seventh modification (FIG. 13) and the discharge current of the capacitor 21 in the configuration described in the eighth modification (FIG. 14).

Figure 15:
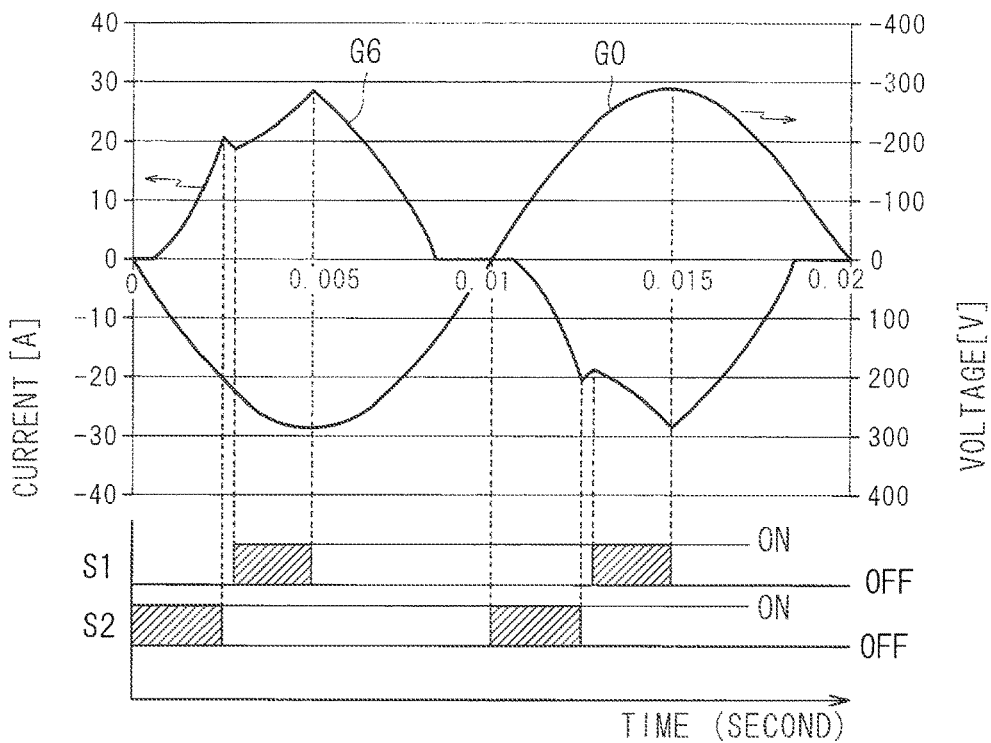
FIG. 15 is a graph illustrating an example of an operation of the power conversion device in the configuration according to the first to eighth modifications.

FIG. 15 is a graph illustrating an example of an operation of the power conversion device 100 in the first to eighth modifications (FIG. 7 to FIG. 14), and corresponds to FIG. 2. The waveform G0 and the symbols S1 and S2 are synonymous with the definition used in the description with reference to FIG. 2. A waveform G6 indicates a waveform of the input current Ia.

Also in the first to eighth modifications, the first switch 51 makes the transition from the conduction state to the non-conduction state once in the half cycle period of the AC voltage Va in the third operation. The second switch 52 makes the transition from the conduction state to the non-conduction state at least once in the half cycle period.

In the first to eighth modifications, in the half cycle period, the first switch 51 makes the transition from the non-conduction state to the conduction state after the second switch 52 makes the transition from the conduction state to the non-conduction state (this can be deemed as the changing from the first state to the second state by the second switch 52). Such operations of the first switch 51 and the second switch 52 prevent the state where both switches are conducted.

However, as shown in the waveform G6, an absolute value of the input current Ia decreases in an interval when the second switch 52 enters the non-conduction state until the first switch 51 enters the conduction state, and the power factor decreases.

Figure 16:
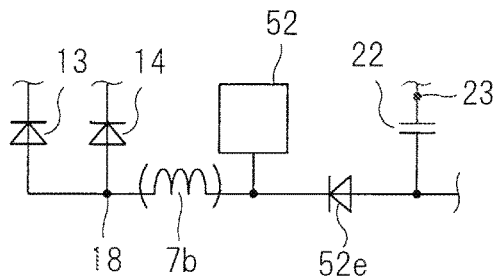
FIG. 16 is a circuit diagram illustrating a configuration according to a ninth modification.
Figure 17:
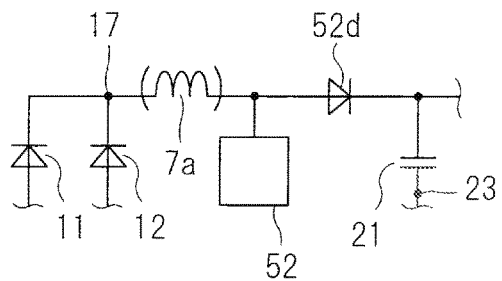
FIG. 17 is a circuit diagram illustrating a configuration according to a tenth modification.

FIG. 16 is a circuit diagram illustrating a configuration according to a ninth modification, which is a further modification applicable to any of the first, second, fifth, and seventh modifications (FIG. 7, FIG. 8, FIG. 11, and FIG. 13). FIG. 17 is a circuit diagram illustrating a configuration according to a tenth modification, which is a further modification applicable to any of the third, fourth, sixth, and the eighth modifications (FIG. 9, FIG. 10, FIG. 12, and FIG. 14). FIG. 16 takes out and partially illustrates only a neighborhood of a portion where the second switch 52, the capacitor 22, and the diodes 13 and 14 are connected, and FIG. 17 takes out and partially illustrates only a neighborhood of a portion where the second switch 52, the capacitor 21, and the diodes 11 and 12 are connected.

The reactor 7b enclosed in parentheses in FIG. 16 exists in a case where the configuration of FIG. 16 is applied to the configuration according to the seventh modification (FIG. 13), and does not exist in a case where the configuration of FIG. 16 is applied to the configuration according to the first, second, and fifth modifications (FIG. 7, FIG. 8, and FIG. 11) but is simply a wiring. In the similar manner, the reactor 7a enclosed in parentheses in FIG. 17 exists in a case where the configuration of FIG. 17 is applied to the configuration according to the eighth modification (FIG. 14), and does not exist in a case where the configuration of FIG. 17 is applied to the configuration according to the third, fourth, and sixth modifications (FIG. 9, FIG. 10, and FIG. 12) but is simply a wiring.

In the configuration according to the ninth modification (FIG. 16), the diode 52e is connected to the capacitor 22 in series between the output terminal 18 and the connection point 23 regardless of whether the reactor 7b exists or not. A forward direction of the diode 52e coincides with a direction in which the current charging the capacitor 22 flows, that is to say, a direction from the capacitor 22 toward the output terminal 18.

When the reactor 7b exists, the diode 52e is sandwiched between the reactor 7b and the capacitor 22 and connected to the reactor 7b and the capacitor 22 in series between the output terminal 18 and the connection point 23. The diode 52e sandwiches the reactor 7b together with the output terminal 18.

In the configuration according to the tenth modification (FIG. 17), the diode 52d is connected to the capacitor 21 in series between the output terminal 17 and the connection point 23 regardless of whether the reactor 7a exists or not. A forward direction of the diode 52d coincides with a direction in which the current charging the capacitor 21 flows, that is to say, a direction from the output terminal 17 toward the capacitor 21.

When the reactor 7a exists, the diode 52d is sandwiched between the reactor 7a and the capacitor 21 and connected to the reactor 7a and the capacitor 21 in series between the output terminal 17 and the connection point 23. The diode 52d sandwiches the reactor 7a together with the output terminal 17.

Accordingly, in the ninth modification and the tenth modification, the diode of the direction opposite to the discharge current is interposed in the discharge pathway of the capacitors 21 and 22 even when both the first switch 51 and the second switch 52 are conducted. Accordingly, the discharge of the capacitors 21 and 22 is inhibited even when the third operation in the second embodiment is performed or the third operation in the third embodiment is performed.

When compared with the configurations according to the fifth modification (FIG. 11) and the sixth modification (FIG. 12), the configurations according to the seventh modification (FIG. 13) and the eighth modification (FIG. 14) are disadvantageous from a viewpoint that the reactor 7b or the reactor 7a is also necessary when the first switch 51 is conducted and the voltage doubler rectification is performed regardless of whether the modifications illustrated in FIG. 16 and FIG. 17 are applied or not.

Figure 18:
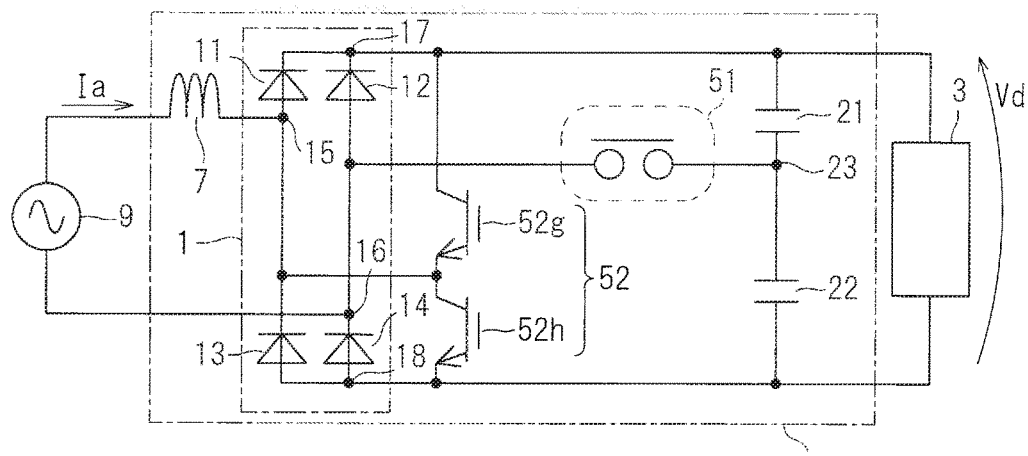
FIG. 18 is a circuit diagram illustrating a configuration according to an eleventh modification.

FIG. 18 is a circuit diagram illustrating a configuration according to an eleventh modification. The second switch 52 has switch elements 52g and 52h. The switch element 52g is connected between the output terminal 17 and the input terminal 15, and the switch element 52h is connected between the output terminal 18 and the input terminal 15. The second switch 52 itself is introduced in Japanese Patent Application Laid-Open No. 2000-188867, for example.

Illustrated herein is an example of a case where each of the switch elements 52g and 52h is constituted of an IGBT. Specifically, illustrated is an example of a case where the switch element 52g is achieved by an IGBT having a collector connected to the output terminal 17 and an emitter connected to the input terminal 15, and the switch element 52h is achieved by an IGBT having an emitter connected to the output terminal 18 and a collector connected to the input terminal 15.

The conduction of the switch element 52g enables the current to flow from the output terminal 17 to the input terminal 15. The conduction of the switch element 52h enables the current to flow from the input terminal 15 to the output terminal 18.

In the half cycle period in which the potential of the input terminal 15 is higher than that of the input terminal 16, when the switch element 52h is conducted, the current flowing in the reactor 7 (the input current Ia herein) flows via the switch element 52h and the diode 14. Thus, the capacitors 21 and 22 are not included in the pathway through which the current flows, and the first state is achieved.

When the switch element 52h is in the non-conduction state in the half cycle period, the pathway of the current flowing in the reactor 7 includes at least the capacitor 21, and the second state is achieved. When the first switch 51 is conducted, the pathway includes the capacitor 21, and when the first switch 51 is not conducted, the pathway includes the capacitors 21 and 22.

That is to say, the switch element 52h can be deemed to perform the changing between the first state and the second state in the half cycle period. The changing does not depend on the conduction/non-conduction of the switch element 52g.

In the similar manner, in the half cycle period in which the potential of the input terminal 15 is lower than that of the input terminal 16, when the switch element 52g is conducted, the current flowing in the reactor 7 flows via the switch element 52g and the diode 12. Thus, the capacitors 21 and 22 are not included in the pathway through which the current flows, and the first state is achieved.

When the switch element 52g is in the non-conduction state in the half cycle period, the pathway of the current flowing in the reactor 7 includes at least the capacitor 22, and the second state is achieved. When the first switch 51 is conducted, the pathway includes the capacitor 22, and when the first switch 51 is not conducted, the pathway includes the capacitors 21 and 22.

That is to say, the switch element 52g can be deemed to perform the changing between the first state and the second state in the half cycle period. The changing does not depend on the conduction/non-conduction of the switch element 52h.

From the above, also in the configuration according to the eleventh modification (FIG. 18), the second switch 52 can be deemed to perform the changing between the first state and the second state.

As described above, all of the switch elements 52g and 52h are not conducted, thus when the first switch 51 is not conducted, the capacitors 21 and 22 do not discharge.

However, when the switch element 52h is conducted, and also when the first switch 51 is conducted in the half cycle period in which the potential of the input terminal 15 is higher than that of the input terminal 16, the current, which discharges the capacitor 22 via the switch element 52h and the first switch 51, flows from the input terminals 15 and 16 via the power source 9 and the reactor 7. In the similar manner, when the switch element 52g is conducted, and also when the first switch 51 is conducted in the half cycle period in which the potential of the input terminal 15 is lower than that of the input terminal 16, the current, which discharges the capacitor 21 via the switch element 52g and the first switch 51, flows from the input terminals 15 and 16 via the power source 9 and the reactor 7. Although the discharge current increases the current flowing in the reactor 7 (that is to say, the input current Ia), this increase does not contribute to the load power.

Accordingly, it is preferable to avoid the state where both the first switch 51 and the second switch 52 are in the conduction state (that is to say, the state where both the first switch 51 and the switch element 52g are in the conduction state, or the state where both the first switch 51 and the switch element 52h are in the conduction state) to inhibit the discharge of the capacitors 21 and 22 and further prevent the increase in the input current Ia which does not contribute to the load power.

Figure 19:
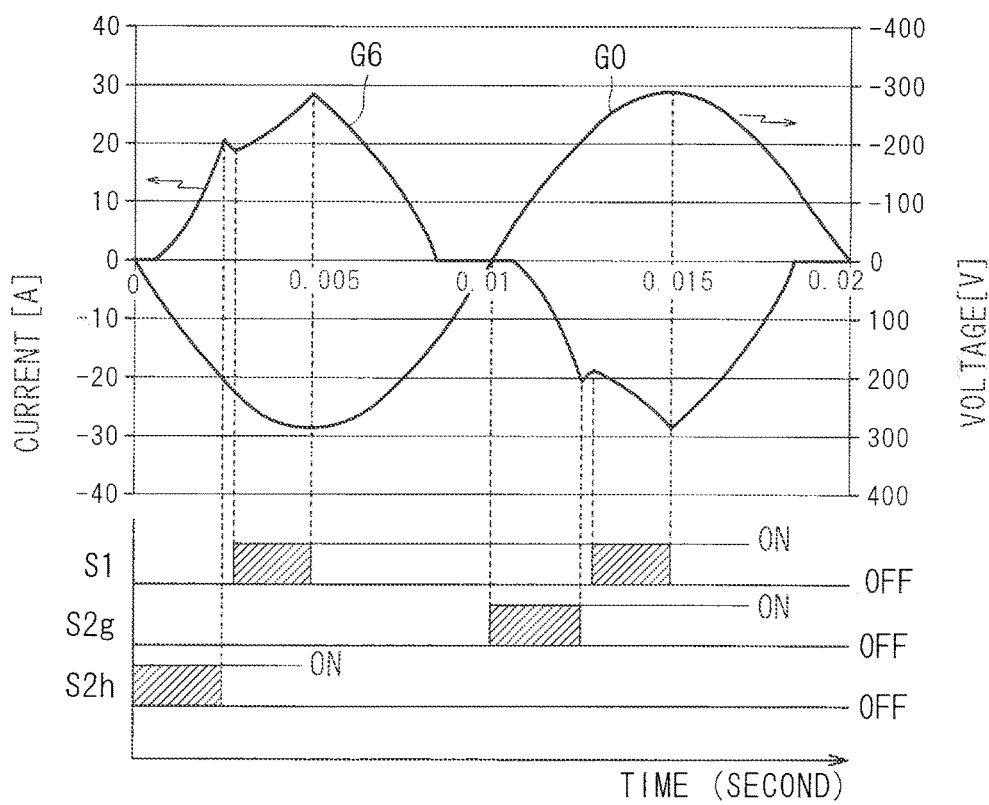
FIG. 19 is a graph illustrating an example of an operation of the power conversion device in the configuration according to the eleventh modification.

FIG. 19 is a graph illustrating an example of an operation of the power conversion device 100 in the eleventh modification (FIG. 18), and corresponds to FIG. 2. The waveforms G0 and G6 and the symbol S1 are synonymous with the definition used in the description with reference to FIG. 15. Symbols S2g and S2h indicate the conduction state/non-conduction state of the switch elements 52g and 52h in the third operation by ON/OFF, respectively.

Also in the eleventh modification, the first switch 51 makes the transition from the conduction state to the non-conduction state once in the half cycle period of the AC voltage Va in the third operation. The second switch 52 makes the transition from the conduction state to the non-conduction state at least once in the half cycle period as a whole (collecting the switch elements 52g and 52h). Herein, similar to the case illustrated in FIG. 15, in the half cycle period, the first switch 51 makes the transition from the non-conduction state to the conduction state after the second switch 52 makes the transition from the conduction state to the non-conduction state (this can be deemed as the changing from the first state to the second state by the second switch 52). Such operations of the first switch 51 and the second switch 52 prevent the state where both switches are conducted.

Figure 20:
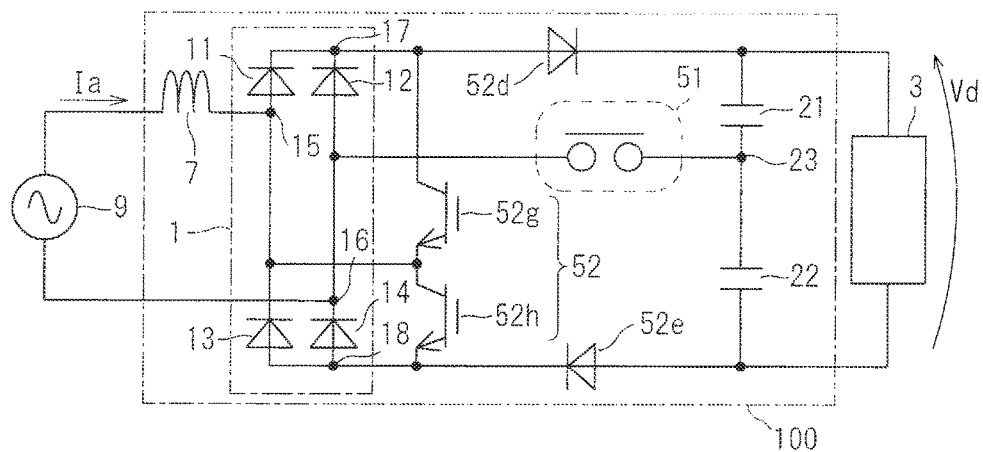
FIG. 20 is a circuit diagram illustrating a configuration according to a twelfth modification.

FIG. 20 is a circuit diagram illustrating a configuration according to a twelfth modification, and has a configuration of adding the diodes 52d and 52e to the configuration according to the eleventh modification. The diode 52e is sandwiched between the output terminal 18 and the capacitor 22 and connected to the capacitor 22 in series between the output terminal 18 and the connection point 23, and a forward direction of the diode 52e coincides with a direction in which the current charging the capacitor 22 flows. Specifically, the anode of the diode 52e is connected to the capacitor 22 on an opposite side to the connection point 23, and the cathode of the diode 52e is connected to the output terminal 18. The diode 52d is sandwiched between the output terminal 17 and the capacitor 21 and connected to the capacitor 21 in series between the output terminal 17 and the connection point 23, and a forward direction of the diode 52d coincides with a direction in which the current charging the capacitor 21 flows. Specifically, the cathode of the diode 52d is connected to the capacitor 21 on an opposite side to the connection point 23, and the anode of the diode 52d is connected to the output terminal 17.

According to the twelfth modification, in the manner similar to the ninth modification (FIG. 16) and the tenth modification (FIG. 17), the discharge of the capacitors 21 and 22 is inhibited even when the third operation in the second embodiment is performed or the third operation in the third embodiment is performed.

Figure 21:
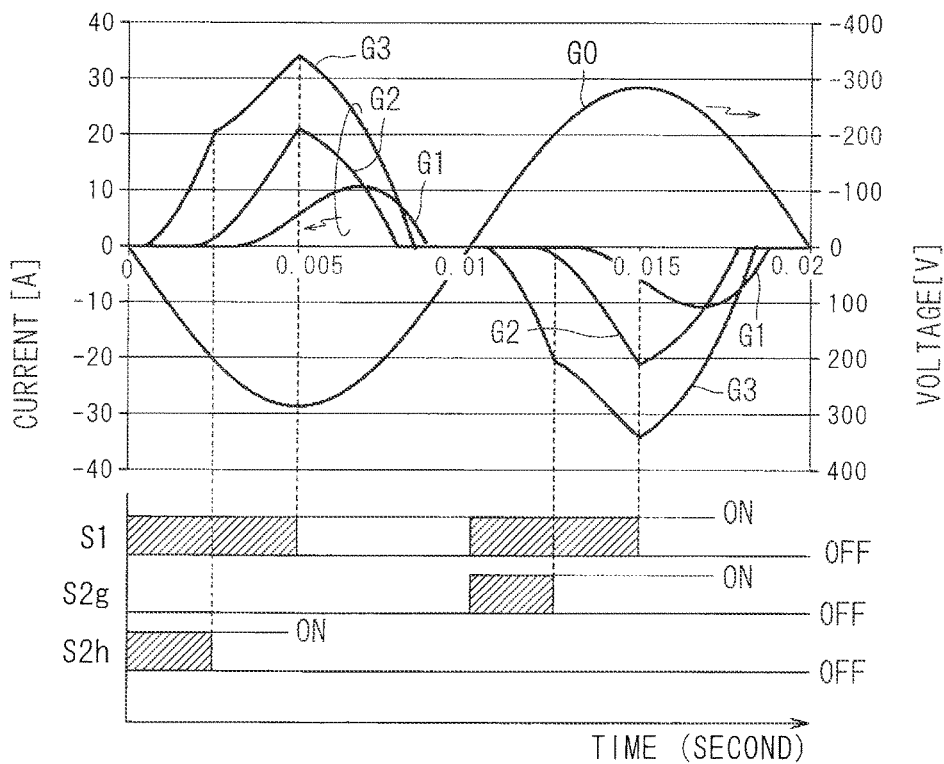
FIG. 21 is a graph illustrating an example of an operation of the power conversion device in the configuration according to the twelfth modification.

FIG. 21 is a graph illustrating an example of an operation of the power conversion device 100 in the twelfth modification (FIG. 20), and corresponds to FIG. 19. The waveforms G0, G1, G2, and G3 and the symbol S1 are synonymous with the definition used in the description with reference to FIG. 2, and symbols S2g and S2h are synonymous with the definition used in the description with reference to FIG. 19. In the twelfth modification, as indicated by the waveform G3, the power factor is improved compared to the waveform G6 in the eleventh modification.

Modification on Threshold Value.

Figure 22:
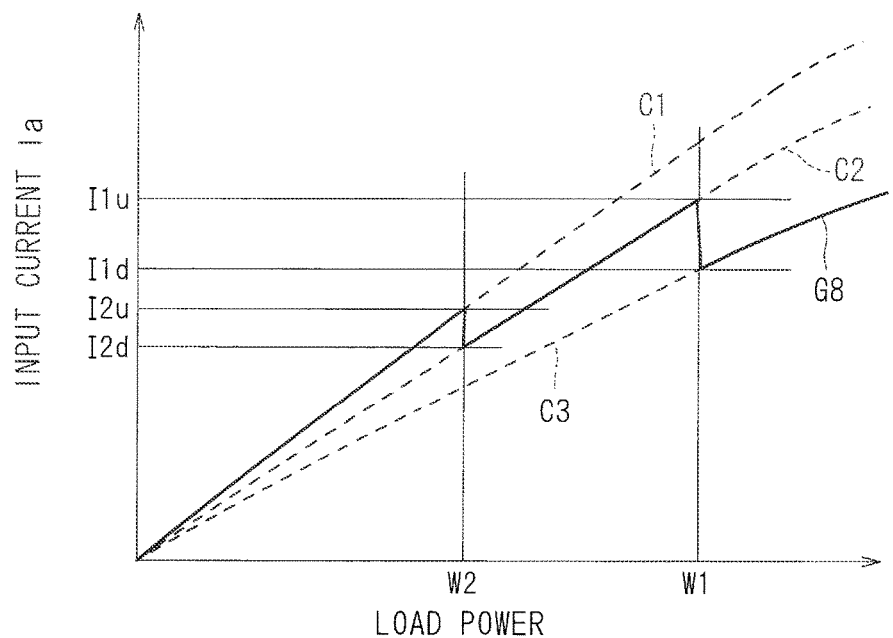
FIG. 22 is a graph illustrating a relationship between a load power and an input current.

FIG. 22 is a graph illustrating a relationship between the load power and the input current Ia. As described above, the load power is an example of the conversion power, and the following description is reasonable even when the load power is replaced with the input power.

Curved lines C1, C2, and C3 indicate the relationship described above in the first operation, the second operation, and the third operation by broken lines, respectively. As described above, the power factor is improved (increased) in the second operation compared to the first operation, and the third operation compared to the second operation.

Since the power source 9 is generally a commercial power source and supplies the AC voltage Va at a constant voltage in which the effective value is stable, the load power is directly proportional to a product of the input current Ia and the power factor. Thus, when the load power is the same, the curved line C2 indicates the lower input current Ia than the curved line C1, the curved line C3 indicates the lower input current Ia than the curved line C2. Even in the same operation state, the power factor is generally high in a case where the input current Ia is large.

A curved line G8 indicates a relationship between the load power and the input current Ia in a case where the power conversion device 100 adopts, in the embodiments or modifications described above, the third operation when the load power is equal to or larger than a first threshold value W1, the second operation when the load power is equal to or larger than a second threshold value W2, which is smaller than the first threshold value W1, and smaller than the first threshold value W1, and the first operation when the load power is smaller than the second threshold value W2. The curved line G8 coincides with the curved line C1 when the load power is smaller than the second threshold value W2, the curved line C2 when the load power is equal to or larger than the second threshold value W2 and smaller than the first threshold value, and the curved line C3 when the load power is equal to or larger than the first threshold value W1.

When the load power increases within a range smaller than the second threshold value W2, the input current Ia increases. Subsequently, when the load power increases to reach the second threshold value W2, the operation of the power conversion device 100 makes the transition from the first operation to the second operation, and the input current Ia thus decreases from a value I2u to a value I2d. The reason is that the power factor is improved (increased) by the transition described above.

When the load power further increases within a range smaller than the first threshold value W1, the input current Ia also further increases. Subsequently, when the load power increases to reach the first threshold value W1, the operation of the power conversion device 100 makes the transition from the second operation to the third operation, and the input current Ia thus decreases from a value I1u to a value I1d.

When the load power further increases within a range equal to or larger than the first threshold value W1, the input current Ia also further increases.

Thus, when the load power increases, the input current Ia can be adopted instead of the load power as a basis of the transition of the operation of the power conversion device 100 between the first operation, the second operation, and the third operation.

Specifically, when the input current Ia increases within a range smaller than the value I2u, the power conversion device 100 performs the first operation. That is to say, the first switch 51 is in the non-conduction state, and the second state is achieved without the changing of the second switch 52.

When the input current Ia increases from the value smaller than the value I2u to reach the value I2u, the power conversion device 100 performs the second operation. That is to say, the first switch 51 makes the transition from the conduction state to the non-conduction state once in the half cycle period in the state where the second state is achieved without the changing of the second switch 52.

When the input current Ia increases from the value smaller than the value I1u to reach the value I1u, the power conversion device 100 performs the third operation. That is to say, the first switch 51 makes the transition from the conduction state to the non-conduction state once in the half cycle period, and the second switch 52 performs the changing from the first state to the second state at least once in the half cycle period. Even when the input current Ia further increases, the third operation is maintained.

The same applies to a case where the load power decreases. When the load power decreases to reach the first threshold value W1, the operation of the power conversion device 100 makes the transition from the third operation to the second operation, and the input current Ia thus increases from the value I1d to the value I1u. The reason is that the power factor is deteriorated (decreased) by the transition described above.

When the load power further decreases within a range equal to or larger than the second threshold value W2, the input current Ia also further decreases. When the load power decreases to reach the second threshold value W2, the operation of the power conversion device 100 makes the transition from the second operation to the first operation, and the input current Ia thus increases from the value I2d to the value I2u.

When the load power further decreases within a range smaller than the first threshold value W1, the input current Ia also further decreases.

Thus, also when the load power decreases, the input current Ia can be adopted instead of the load power as the basis of the transition of the operation of the power conversion device 100 between the first operation, the second operation, and the third operation.

Specifically, when the input current Ia decreases within a range equal to or larger than the value I1d, the third operation is maintained. When the input current Ia further decreases to reach the value I1d, the operation of the power conversion device 100 makes the transition from the third operation to the second operation. When the input current Ia further decreases to reach the value I2d, the operation of the power conversion device 100 makes the transition from the second operation to the first operation. Even when the input current Ia further decreases, the first operation is maintained.

From the above, in the operation of the power conversion device 100, the operations of the first switch 51 and second switch 52 may be controlled under the determination in which the load power is replaced with the input current Ia. Considering that the input current Ia once increases to cause the transition from the second operation to the third operation and subsequently the input current Ia decreases to cause the transition from the third operation to the second operation, it is preferable to satisfy a relationship of I1u>I1d. In the similar manner, it is preferable to satisfy a relationship of I2u>I2d. FIG. 22 illustrates an example of a case where a relationship of I1d>I2u is satisfied.

Thus, adoptable as the operation of the power conversion device 100 are the third operation when the input current Ia is equal to or larger than the value I1u, the second operation when the input current Ia is equal to or larger than the value I2u and smaller than the value I1d, and the first operation when the input current Ia is smaller than the value I2d, for example.

As the threshold value of the input current Ia as a basis of the transition of the operation, the pair of values I1u and I1d are adopted to correspond to the first threshold value W1 of the load power, and the pair of values I2u and I2d are adopted to correspond to the second threshold value W2. This can also be considered as the following: as the threshold value of the input current Ia, the value I1u is adopted to correspond to the first threshold value W1 and the value I2u is adopted to correspond to the second threshold value W2 when the input current Ia increases; and the value I1d is adopted to correspond to the first threshold value W1 and the value I2d is adopted to correspond to the second threshold value W2 when the input current Ia decreases.

In other words, it can also be considered that the threshold value of the input current Ia for determining the operation of the power conversion device 100 varies with the cases where the input current Ia increases and decreases and shows hysteresis.

Figure 23:
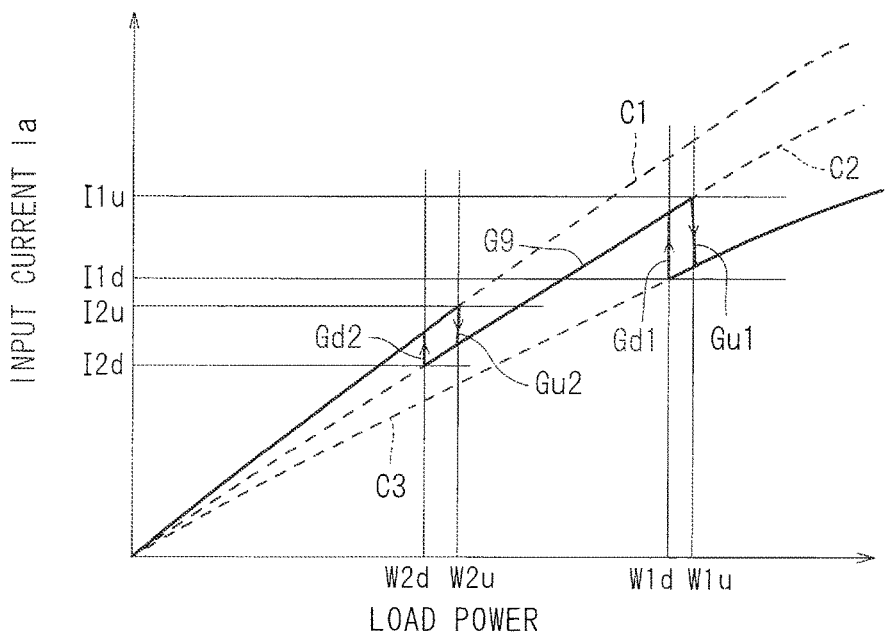
FIG. 23 is a graph illustrating a relationship between a load power and an input current.

The first threshold value and the second threshold value of the load power may also show the hysteresis. FIG. 23 is a graph illustrating a relationship between the load power and the input current Ia in a case where the hysteresis is introduced. All of the curved lines C1, C2, and C3 are described in FIG. 22. A curved line G9 indicates a relationship between the load power and the input current Ia in a case where the power conversion device 100 adopts, in the embodiments or modifications described above, the third operation when the load power is equal to or larger than the first threshold value, the second operation when the load power is equal to or larger than the second threshold value, which is smaller than the first threshold value, and smaller than the first threshold value, and the first operation when the load power is smaller than the second threshold value.

Values W1u and W2u are the first threshold value and the second threshold value when the load power increases, respectively, and values W1d and W2d are the first threshold value and the second threshold value when the load power decreases, respectively. FIG. 23 illustrates an example of a case where a relationship of W1u>W1d>W2u>W2d is satisfied.

Specifically, in the increase in the load power, the power conversion device 100 performs the first operation when the load power is smaller than the value W2u, and the curved line G9 coincides with the curved line C1. The power conversion device 100 performs the second operation when the load power increases from the value smaller than the value W2u to reach the value W1u, and the curved line G9 coincides with the curved line C2. Thus, in the increase in the load power, the curved line G9 shifts from the curved line C1 to the curved line C2 via a pathway Gu2 when the load power takes the value W2u. The power conversion device 100 performs the third operation when the load power increases from the value smaller than the value W1u to reach the value equal to or larger than the value W1u, and the curved line G9 coincides with the curved line C3. Thus, in the increase in the load power, the curved line G9 shifts from the curved line C2 to the curved line C3 via the pathway Gu1 when the load power takes the value W1u.

In the decrease in the load power, the power conversion device 100 performs the third operation when the load power is equal to or larger than the value W1d, and the curved line G9 coincides with the curved line C3. The power conversion device 100 performs the second operation when the load power decreases from the value smaller than the value W1d to reach the value W2d, and the curved line G9 coincides with the curved line C2. Thus, in the decrease in the load power, the curved line G9 shifts from the curved line C3 to the curved line C2 via the pathway Gd1 when the load power takes the value W1d. The power conversion device 100 performs the first operation when the load power decreases to reach the value smaller than the value W2d, and the curved line G9 coincides with the curved line C1. Thus, in the decrease in the load power, the curved line G9 shifts from the curved line C2 to the curved line C1 via the pathway Gd2 when the load power takes the value W2d.

As described above, even when the first threshold value and the second threshold value of the load power have the hysteresis, the comparison between the input current Ia and the threshold value can be performed to determine the operation of the power conversion device 100. Specifically, the input current Ia in the first operation in the case where the load power takes the value W2u can be adopted to the value I2u, which is the second threshold value in the increase in the input current Ia, the input current Ia in the second operation in the case where the load power takes the value W2d can be adopted to the value I2d, which is the second threshold value in the decrease in the input current Ia, the input current Ia in the second operation in the case where the load power takes the value W1u can be adopted to the value I1u, which is the first threshold value in the increase in the input current Ia, and the input current Ia in the third operation in the case where the load power takes the value W1d can be adopted to the value I1d, which is the first threshold value in the decrease in the input current Ia.

However, it is preferable to satisfy a relationship of W1u>W1d>W2u>W2d from a view point of performing the transition between the first operation and the second operation or the second operation and the third operation in the case where the input current Ia once increases and then decreases or the case where the load power once increases and then decreases.

In other words, it is preferable that not only the relationship of I1u>I1d is satisfied but the load power in the case where the input current Ia takes the value I1u in the second operation is larger than the load power in the case where the input current Ia takes the value I1d in the third operation. In the similar manner, it is preferable that not only the relationship of I2u>I2d is satisfied but the load power in the case where the input current Ia takes the value I2u in the first operation is larger than the load power in the case where the input current Ia takes the value I2d in the second operation.

It is obvious the above description is reasonable in the case where the relationship of W1=W1u=W1d is satisfied and the case where the relationship of W2=W2u=W2d is satisfied. When both W1=W1u=W1d and W2=W2u=W2d are satisfied, the description using FIG. 22 and the description using FIG. 23 coincide with each other. Furthermore, W1=W2 may be applied to allow just the transition between the first operation and the third operation without using the second operation, or W1>W2=0 may be applied to allow just the transition between the second operation and the third operation without using the first operation.

In all of the embodiments and modifications described above, the first switch 51 and the second switch 52 are defined on the basis of their operations. All of the embodiments and modifications described above may be understood as a method of controlling the operation of the conduction/non-conduction of the first switch 51 and the operation of the conduction/non-conduction of the second switch 52 or the changing between the first state and the second state by the second switch 52.

FIG. 24 is a block diagram illustrating an example of a configuration of controlling the operations of the first switch 51 and the second switch 52. For simplification, an inner configuration of the power conversion device 100 is omitted, and the first switch 51 and the second switch 52 are simplistically illustrated.

A control circuit 200 generates a signal J1 for controlling the operation of the first switch 51 and a signal J2 for controlling the second switch 52. The signal J1 is supplied to the first switch 51, and the signal J2 is supplied to the second switch 52. The signal J1 is supplied to a gate of the IGBT illustrated in FIG. 1 for the first switch 51, for example. The signal J2 is supplied to a gate of the IGBT illustrated in FIG. 1 and FIG. 11 to FIG. 14 for the second switch 52, for example.

Alternatively, the signal J2 is supplied to each gate of the IGBTs 52a and 52i (refer to FIG. 7 and FIG. 9, respectively). Alternatively, the signal J2 is supplied to each gate of the IGBTs 52b and 52c (refer to FIG. 8) in common or each gate of the IGBTs 52j and 52f (refer to FIG. 10). Alternatively, the signal J2 is a pair of signals supplied to gates of the IGBTs constituting the switch elements 52g and 52h (refer to FIG. 18 and FIG. 20) to turn on these IGBTs mutually exclusively (refer to the symbols S2g and S2h in FIG. 19 and FIG. 21).

The control circuit 200 receives as an input at least one of the AC voltage Va, the input current Ia, the DC voltage Vd, and the load current Id supplied from the power conversion device 100 to the load 3, all of which are measured by a well-known technique.

When the load power is adopted as the conversion power, the DC voltage Vd and the load current Id, for example, are input to the control circuit 200. The control circuit 200 calculates the load power, and compares the load power and the first threshold value W1 (or the values W1u and W1d) or further compares the load power and the second threshold value W2 (or the values W2u and W2d) to generate the signals J1 and J2.

When the input power is adopted as the conversion power, the AC voltage Va and the input current Ia, for example, are input to the control circuit 200. The control circuit 200 calculates the input power, and compares the input power and the first threshold value W1 (or the values W1u and W1d) or further compares the input power and the second threshold value W2 (or the values W2u and W2d) to generate the signals J1 and J2.

Alternatively, the control circuit inputs the input current Ia, and compares the input current Ia and at least one of the values I1u and I1d or further compares the input current Ia and at least one of the values I2u and I2d to generate the signals J1 and J2.

The signals J1 and J2 are generated by a well-known technique to interface with the operations of the first switch 51 and the second switch 52 described in the embodiments and the modifications described above. The control circuit 200 includes a microcomputer and a storage device, for example. The microcomputer executes each processing step (in other words, a procedure) described in a program. The storage device described above can be constituted of one of a ROM (read only memory), a RAM (random access memory), a rewritable non-volatile memory (EPROM (erasable programmable ROM) or the like), and a hard disk device, or some of them, for example. The storage device stores various types of information, and the like, stores a program executed by the microcomputer, and provides a work area for executing the program. The microcomputer can also be considered to function as various means corresponding to each processing step described in the program, or can also be considered to achieve various functions corresponding to each processing step. The configuration of the control circuit 200 is not limited thereto, but part or all of various procedures executed by the control circuit 200 or the various means or the various functions achieved by the control circuit 200 may be achieved by hardware.

The timing of changing the operation of the power conversion device 100 is changed, in accordance with the values of the conversion power or input current, by the switching of ON/OFF of the first switch 51 and the changing of the first state/second state performed by the second switch 52 described above, thus the power factor can be adjusted to have the higher value in the wide operation range.

The present invention has been shown and described in detail, the foregoing description is in all aspects illustrative and not restrictive. Various modifications not exemplified are construed to be made without departing from the scope of the present invention.

The invention claimed is:

1. A power conversion device that converts a single phase AC voltage being output from a power source into a DC voltage and supplies the DC voltage to a load, the power conversion device, comprising:
    a single phase full-bridge rectification circuit having a first input terminal and a second input terminal in a pair and a first output terminal and a second output terminal in a pair on an opposite side to the power source with respect to the first input terminal and the second input terminal, the first output terminal and the second output terminal being connected to the load;
    a first capacitor and a second capacitor connected to each other in series via a connection point between the first output terminal and the second output terminal to support the DC voltage;
    a reactor connected to the power source in series via the single phase full-bridge rectification circuit between both ends of a series connection of the first capacitor and the second capacitor;
    a first switch connected between the second input terminal and the connection point and configured to make a transition from a conduction state to a non-conduction state once in a half cycle period, which indicates a period between a pair of adjacent points of time when the AC voltage takes a median value of the AC voltage, when a conversion power of the power conversion device or an input current supplied from the power source is equal to or larger than a first threshold value; and
    a second switch that performs a changing from a first state to a second state at least once in the half cycle period when the conversion power or the input current is equal to or larger than the first threshold value, the first state indicating a state where a pathway of current flowing in the reactor does not include the first capacitor and the second capacitor, and the second state indicating a state where the pathway includes at least one of the first capacitor and the second capacitor.

2. The power conversion device according to claim 1, wherein
    the reactor is connected between the power source and at least one of the first input terminal and the second input terminal,
    the second switch is connected between the first input terminal and the second input terminal,
    the second switch makes a transition from a conduction state to a non-conduction state at least once in the half cycle period when the conversion power or the input current is equal to or larger than the first threshold value.

3. The power conversion device according to claim 1, wherein
    the reactor is connected between the power source and at least one of the first input terminal and the second input terminal,
    the second switch is connected between the first input terminal and second input terminal and the first output terminal,
    the second switch makes a transition from a conduction state to a non-conduction state at least once in the half cycle period when the conversion power or the input current is equal to or larger than the first threshold value.

4. The power conversion device according to claim 1, further comprising
    a diode connected to the first capacitor in series between the first output terminal and the connection point and sandwiched between the first output terminal and the first capacitor, a forward direction of the diode coinciding with a direction in which a current charging the first capacitor flows, wherein
    the reactor is connected between the power source and at least one of the first input terminal and the second input terminal,
    the second switch is connected between the first output terminal and the second output terminal, and
    the second switch makes a transition from a conduction state to a non-conduction state at least once in the half cycle period.

5. The power conversion device according to claim 1, wherein
    the reactors are provided in a pair, and a first one of the reactors and a second one of the reactors are connected to the first output terminal and the second output terminal, respectively, the power conversion device further comprising
    a diode sandwiched between the first capacitor and the first one of the reactors and connected to the first capacitor and the first one of the reactors in series between the first output terminal and the connection point, a forward direction of the diode coinciding with a direction in which a current charging the first capacitor flows, wherein
    the first one of the reactors is sandwiched between the first output terminal and the diode,
    the second switch is sandwiched between the first one of the reactors and the second one of the reactors and is connected to the first one of the reactors and the second one of the reactors in series between the first output terminal and the second output terminal, and
    the second switch makes a transition from a conduction state to a non-conduction state at least once in the half cycle period.

6. The power conversion device according to claim 3, further comprising
    a diode connected to the second capacitor in series between the second output terminal and the connection point and sandwiched between the second output terminal and the second capacitor, a forward direction of the diode coinciding with a direction in which a current charging the second capacitor flows.

7. The power conversion device according to claim 4, further comprising
a diode connected to the second capacitor in series between the second output terminal and the connection point and sandwiched between the second output terminal and the second capacitor, a forward direction of the diode coinciding with a direction in which a current charging the second capacitor flows.

8. The power conversion device according to claim 5, further comprising
a diode sandwiched between the second capacitor and the second one of the reactors and connected to the second capacitor and the second one of the reactors in series between the second output terminal and the connection point, and sandwiching the second one of the reactors together with the second output terminal, a forward direction of the diode coinciding with a direction in which a current charging the second capacitor flows.

9. The power conversion device according to claim 1, wherein
the second switch includes:
a first switch element connected between the first output terminal and the first input terminal; and
a second switch element connected between the second output terminal and the first input terminal,
when the conversion power or the input current is equal to or larger than the first threshold value, the first switch element makes a transition from a conduction state to a non-conduction state at least once in the half cycle period in which potential of the second input terminal is higher than potential of the first input terminal, and is in a non-conduction state in the half cycle period in which potential of the second input terminal is lower than potential of the first input terminal, and
when the conversion power or the input current is equal to or larger than the first threshold value, the second switch element makes a transition from a conduction state to a non-conduction state at least once in the half cycle period in which potential of the second input terminal is lower than potential of the first input terminal, and is in a non-conduction state in the half cycle period in which potential of the second input terminal is higher than potential of the first input terminal.

10. The power conversion device according to claim 9, further comprising:
a first diode connected to the first capacitor in series between the first output terminal and the connection point, and sandwiched between the first output terminal and the first capacitor, a forward direction of the first diode coinciding with a direction in which a current charging the first capacitor flows, and
a second diode connected to the second capacitor in series between the second output terminal and the connection point, and sandwiched between the second output terminal and the second capacitor, a forward direction of the second diode coinciding with a direction in which a current charging the second capacitor flows.

11. The power conversion device according to claim 1, wherein
when the conversion power or the input current is equal to or larger than a second threshold value, which is smaller than the first threshold value, and smaller than the first threshold value,
the first switch makes a transition from a conduction state to a non-conduction state once in the half cycle period, and
the second state is achieved without the changing of the second switch.

12. The power conversion device according to claim 11, wherein
when the conversion power or the input current is smaller than the second threshold value,
the first switch is in a non-conduction state, and
the second state is achieved without the switching of the second switch.

13. The power conversion device according to claim 1, wherein
when the conversion power or the input current is smaller than the first threshold value,
the first switch is in a non-conduction state, and
the second state is achieved without the switching of the second switch.

14. The power conversion device according to claim 2, wherein
when the conversion power or the input current is equal to or larger than the first threshold value, the changing of the second switch is performed when the first switch is in a conduction state.

15. The power conversion device according to claim 6, wherein
when the conversion power or the input current is equal to or larger than the first threshold value, the changing of the second switch is performed when the first switch is in a conduction state.

16. The power conversion device according to claim 7, wherein
when the conversion power or the input current is equal to or larger than the first threshold value, the changing of the second switch is performed when the first switch is in a conduction state.

17. The power conversion device according to claim 8, wherein
when the conversion power or the input current is equal to or larger than the first threshold value, the changing of the second switch is performed when the first switch is in a conduction state.

18. The power conversion device according to claim 10, wherein
when the conversion power or the input current is equal to or larger than the first threshold value, the changing of the second switch is performed when the first switch is in a conduction state.

19. The power conversion device according to claim 1, wherein
a point of time when the second switch performs the changing is between a point of time after an elapse of $1/6$ of the half cycle period from a starting point of the half cycle period and a point of time after an elapse of $5/6$ of the half cycle period from the starting point.

20. The power conversion device according to claim 2, wherein
when the conversion power or the input current is equal to or larger than the first threshold value, a transition of the first switch from a non-conduction state to a conduction state is performed when the first state is achieved.

21. The power conversion device according to claim 6, wherein
when the conversion power or the input current is equal to or larger than the first threshold value, a transition of the first switch from a non-conduction state to a conduction state is performed when the first state is achieved.

22. The power conversion device according to claim 7, wherein
when the conversion power or the input current is equal to or larger than the first threshold value, a transition of the first switch from a non-conduction state to a conduction state is performed when the first state is achieved.

23. The power conversion device according to claim 8, wherein
when the conversion power or the input current is equal to or larger than the first threshold value, a transition of the first switch from a non-conduction state to a conduction state is performed when the first state is achieved.

24. The power conversion device according to claim 10, wherein
when the conversion power or the input current is equal to or larger than the first threshold value, a transition of the first switch from a non-conduction state to a conduction state is performed when the first state is achieved.

25. The power conversion device according to claim 3, wherein
when the conversion power or the input current is equal to or larger than the first threshold value,
the changing of the second switch is performed when the first switch is a non-conduction state, and a transition of the first switch from the non-conduction state to the conduction state is performed when the second state is achieved.

26. The power conversion device according to claim 4, wherein
when the conversion power or the input current is equal to or larger than the first threshold value,
the changing of the second switch is performed when the first switch is a non-conduction state, and a transition of the first switch from the non-conduction state to the conduction state is performed when the second state is achieved.

27. The power conversion device according to claim 5, wherein
when the conversion power or the input current is equal to or larger than the first threshold value,
the changing of the second switch is performed when the first switch is a non-conduction state, and a transition of the first switch from the non-conduction state to the conduction state is performed when the second state is achieved.

28. The power conversion device according to claim 9, wherein
when the conversion power or the input current is equal to or larger than the first threshold value,
the changing of the second switch is performed when the first switch is a non-conduction state, and a transition of the first switch from the non-conduction state to the conduction state is performed when the second state is achieved.

29. The power conversion device according to claim 1, wherein
the conversion power is a power supplied to the load.

30. The power conversion device according to claim 1, wherein
the conversion power is a power being input to the power conversion device.

31. The power conversion device according to claim 1, wherein
operations of the first switch and the second switch are controlled on a basis of a magnitude of the input current.

32. The power conversion device according to claim 31, wherein
the first threshold value when the input current increases is larger than the first threshold value when the input current decreases.

* * * * *